US012393147B2

(12) United States Patent
Maehara et al.

(10) Patent No.: US 12,393,147 B2
(45) Date of Patent: Aug. 19, 2025

(54) IMAGE FORMING APPARATUS

(71) Applicant: CANON KABUSHIKI KAISHA, Tokyo (JP)

(72) Inventors: Takashi Maehara, Chiba (JP); Naoto Watanabe, Chiba (JP); Nozomi Kumakura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/583,113

(22) Filed: Feb. 21, 2024

(65) Prior Publication Data

US 2024/0288816 A1 Aug. 29, 2024

(30) Foreign Application Priority Data

Feb. 27, 2023 (JP) ................................ 2023-028425

(51) Int. Cl.
*G03G 15/00* (2006.01)

(52) U.S. Cl.
CPC ..... *G03G 15/5062* (2013.01); *G03G 15/5016* (2013.01)

(58) Field of Classification Search
CPC .......... G03G 15/5016; G03G 15/5041; G03G 15/5058; G03G 15/5062; G03G 2215/00569
See application file for complete search history.

(56) References Cited

U.S. PATENT DOCUMENTS 9,436,145 B2 * 9/2016 Shirafuji ........... G03G 15/5041
11,016,428 B1 * 5/2021 Ishihara ............ G03G 15/5058
11,178,290 B2 11/2021 Sekita
2021/0185181 A1 * 6/2021 Tomii ................... G06F 3/1285

* cited by examiner

*Primary Examiner* — Hoang X Ngo
(74) *Attorney, Agent, or Firm* — ROSSI, KIMMS & McDOWELL LLP

(57) ABSTRACT

An image forming apparatus includes an image forming unit configured to form an image on a sheet through use of toner a reading unit configured to read the sheet on which a mark for correction is formed a display, and a controller configured to display a plurality of images included in a print job in a selectable manner, acquire user selection information indicating a selection result for an image selected from among the plurality of images, determine, based on the user selection information, an image for adjustment to be formed by the image forming unit, the image for adjustment including a pattern image, which is to have a toner adhesion amount corresponding to a density of the selected image, and the mark for correction, and control the image forming unit to form the image for adjustment on a sheet.

11 Claims, 21 Drawing Sheets

600

| | PAPER SHEET NAME (611) | PAPER SHEET LENGTH IN SHORT-SIDE DIRECTION [mm] (612) | PAPER SHEET LENGTH IN LONG-SIDE DIRECTION [mm] (613) | BASIS WEIGHT [g/m²] (614) | SURFACE PROPERTY (615) | COLOR (616) | PREPRINTED PAPER (617) | TONER ADHESION AMOUNT CLASS 1 (618–619): PRINTING POSITION DEVIATION AMOUNT (FRONT SURFACE) | TONER ADHESION AMOUNT CLASS 1 (618–619): PRINTING POSITION DEVIATION AMOUNT (BACK SURFACE) | TONER ADHESION AMOUNT CLASS 2 (620–621): PRINTING POSITION DEVIATION AMOUNT (FRONT SURFACE) | TONER ADHESION AMOUNT CLASS 2 (620–621): PRINTING POSITION DEVIATION AMOUNT (BACK SURFACE) |
|---|---|---|---|---|---|---|---|---|---|---|---|
| 601 | ABC PAPER, RECYCLED 1 | 210 | 297 | 75 | PLAIN PAPER | WHITE | No | P1:0.23mm<br>P2:0.71mm<br>P3:0.3mm<br>P4:−0.1mm<br>P5:+0.02%<br>P6:+0.01% | P1:0.27mm<br>P2:0.55mm<br>P3:0.2mm<br>P4:0.1mm<br>P5:+0.02%<br>P6:−0.03% | P1:0.25mm<br>P2:0.72mm<br>P3:0.3mm<br>P4:−0.2mm<br>P5:+0.04%<br>P6:+0.02% | P1:0.28mm<br>P2:0.56mm<br>P3:0.2mm<br>P4:0.2mm<br>P5:+0.02%<br>P6:−0.03% |
| 602 | ABC PAPER, RECYCLED 2 | 297 | 420 | 75 | PLAIN PAPER | WHITE | No | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.01mm<br>P2:0.00mm<br>P3:0.0mm<br>P4:0.0mm<br>P5:+0.01%<br>P6:+0.00% | P1:0.00mm<br>P2:0.00mm<br>P3:0.0mm<br>P4:0.0mm<br>P5:+0.00%<br>P6:+0.00% |
| 603 | DEF PAPER, EMBOSSED PAPER A-1 | 216 | 279 | 170 | EMBOSSED | WHITE | No | P1:−0.48mm<br>P2:0.41mm<br>P3:0.5mm<br>P4:−0.5mm<br>P5:+0.02%<br>P6:+0.02% | P1:0.08mm<br>P2:0.29mm<br>P3:−0.3mm<br>P4:0.5mm<br>P5:+0.01%<br>P6:−0.03% | P1:−0.48mm<br>P2:0.41mm<br>P3:0.5mm<br>P4:−0.5mm<br>P5:+0.02%<br>P6:+0.02% | P1:0.08mm<br>P2:0.29mm<br>P3:−0.3mm<br>P4:0.5mm<br>P5:+0.01%<br>P6:−0.03% |
| 604 | DEF PAPER, COATED PAPER P-1 | 279 | 432 | 128 | DOUBLE-SIDED COATED | WHITE | No | P1:0.11mm<br>P2:−0.21mm<br>P3:0.4mm<br>P4:−0.2mm<br>P5:+0.12%<br>P6:+0.08% | P1:0.41mm<br>P2:−0.31mm<br>P3:−0.2mm<br>P4:0.6mm<br>P5:−0.02%<br>P6:−0.01% | P1:0.20mm<br>P2:−0.42mm<br>P3:0.5mm<br>P4:−0.3mm<br>P5:+0.13%<br>P6:+0.11% | P1:0.49mm<br>P2:−0.39mm<br>P3:−0.3mm<br>P4:0.6mm<br>P5:−0.09%<br>P6:−0.10% |
| 605 | XYZ PAPER, COLOR 81 | 210 | 297 | 75 | PLAIN PAPER | ORANGE | No | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% |

P1: RIGHT-ANGLE CORRECTION AMOUNT
P2: TRAPEZOIDAL CORRECTION AMOUNT
P3: LEAD POSITION
P4: SIDE POSITION
P5: LONG-SIDE-DIRECTION MAGNIFICATION
P6: SHORT-SIDE-DIRECTION MAGNIFICATION

FIG. 7A

600

| TONER ADHESION AMOUNT CLASS 3 (622, 623) | | TONER ADHESION AMOUNT CLASS 4 (624, 625) | | TONER ADHESION AMOUNT CLASS 5 (626, 627) | |
|---|---|---|---|---|---|
| PRINTING POSITION DEVIATION AMOUNT (FRONT SURFACE) | PRINTING POSITION DEVIATION AMOUNT (BACK SURFACE) | PRINTING POSITION DEVIATION AMOUNT (FRONT SURFACE) | PRINTING POSITION DEVIATION AMOUNT (BACK SURFACE) | PRINTING POSITION DEVIATION AMOUNT (FRONT SURFACE) | PRINTING POSITION DEVIATION AMOUNT (BACK SURFACE) |
| P1:0.25mm<br>P2:0.73mm<br>P3:0.4mm<br>P4:−0.2mm<br>P5:+0.04%<br>P6:+0.03% | P1:0.28mm<br>P2:0.57mm<br>P3:0.2mm<br>P4:0.3mm<br>P5:+0.02%<br>P6:−0.04% | P1:0.28mm<br>P2:0.75mm<br>P3:0.5mm<br>P4:−0.4mm<br>P5:+0.05%<br>P6:+0.05% | P1:0.30mm<br>P2:0.59mm<br>P3:0.3mm<br>P4:0.3mm<br>P5:+0.03%<br>P6:−0.04% | P1:0.28mm<br>P2:0.76mm<br>P3:0.5mm<br>P4:−0.5mm<br>P5:+0.05%<br>P6:+0.06% | P1:0.31mm<br>P2:0.59mm<br>P3:0.3mm<br>P4:0.4mm<br>P5:+0.03%<br>P6:−0.05% |
| P1:0.03mm<br>P2:0.02mm<br>P3:0.0mm<br>P4:0.1mm<br>P5:+0.02%<br>P6:+0.02% | P1:0.01mm<br>P2:0.02mm<br>P3:0.0mm<br>P4:0.0mm<br>P5:+0.01%<br>P6:+0.00% | P1:0.05mm<br>P2:0.04mm<br>P3:0.1mm<br>P4:0.1mm<br>P5:+0.03%<br>P6:+0.02% | P1:0.03mm<br>P2:0.03mm<br>P3:0.2mm<br>P4:0.1mm<br>P5:+0.01%<br>P6:+0.01% | P1:0.05mm<br>P2:0.04mm<br>P3:0.1mm<br>P4:0.1mm<br>P5:+0.03%<br>P6:+0.02% | P1:0.03mm<br>P2:0.03mm<br>P3:0.2mm<br>P4:0.1mm<br>P5:+0.01%<br>P6:+0.01% |
| P1:−0.48mm<br>P2:0.41mm<br>P3:0.5mm<br>P4:−0.5mm<br>P5:+0.02%<br>P6:+0.02% | P1:0.08mm<br>P2:0.29mm<br>P3:−0.3mm<br>P4:0.5mm<br>P5:+0.01%<br>P6:−0.03% | P1:−0.49mm<br>P2:0.43mm<br>P3:0.5mm<br>P4:−0.5mm<br>P5:+0.03%<br>P6:+0.04% | P1:0.08mm<br>P2:0.29mm<br>P3:−0.3mm<br>P4:0.5mm<br>P5:+0.01%<br>P6:−0.03% | P1:−0.51mm<br>P2:0.44mm<br>P3:0.5mm<br>P4:−0.5mm<br>P5:+0.05%<br>P6:+0.04% | P1:0.09mm<br>P2:0.31mm<br>P3:−0.4mm<br>P4:0.5mm<br>P5:+0.02%<br>P6:−0.04% |
| P1:0.41mm<br>P2:−0.55mm<br>P3:0.6mm<br>P4:−0.5mm<br>P5:+0.19%<br>P6:+0.13% | P1:0.60mm<br>P2:−0.56mm<br>P3:−0.5mm<br>P4:0.9mm<br>P5:−0.12%<br>P6:−0.16% | P1:0.71mm<br>P2:−0.75mm<br>P3:0.8mm<br>P4:−0.6mm<br>P5:+0.21%<br>P6:+0.15% | P1:0.68mm<br>P2:−0.66mm<br>P3:−0.6mm<br>P4:0.9mm<br>P5:−0.18%<br>P6:−0.19% | P1:1.03mm<br>P2:−0.98mm<br>P3:0.9mm<br>P4:−0.8mm<br>P5:+0.25%<br>P6:+0.22% | P1:0.80mm<br>P2:−0.69mm<br>P3:−0.8mm<br>P4:1.0mm<br>P5:−0.20%<br>P6:−0.22% |
| P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% | P1:0.00mm<br>P2:0.00mm<br>P3:0.0mm<br>P4:0.0mm<br>P5:+0.00%<br>P6:+0.00% |

P1: RIGHT-ANGLE CORRECTION AMOUNT
P2: TRAPEZOIDAL CORRECTION AMOUNT
P3: LEAD POSITION
P4: SIDE POSITION
P5: LONG-SIDE-DIRECTION MAGNIFICATION
P6: SHORT-SIDE-DIRECTION MAGNIFICATION

FIG. 7B

| | | 820 MEASURED VALUE | 821 IDEAL VALUE | 822 PRINTING POSITION DEVIATION AMOUNT |
|---|---|---|---|---|
| 801 | LEAD POSITION (FRONT SURFACE) | (C+E)/2 | 1cm | MEASURED VALUE −IDEAL VALUE |
| 802 | SIDE POSITION (FRONT SURFACE) | (F+J)/2 | 1cm | MEASURED VALUE −IDEAL VALUE |
| 803 | LONG-SIDE-DIRECTION MAGNIFICATION (FRONT SURFACE) | ((B-D-F)+(B-H-J))/2 | PAPER SHEET LENGTH IN LONG-SIDE DIRECTION −2cm | (MEASURED VALUE− IDEAL VALUE) /IDEAL VALUE |
| 804 | SHORT-SIDE-DIRECTION MAGNIFICATION (FRONT SURFACE) | ((A-C-G)+(A-E-I))/2 | PAPER SHEET LENGTH IN SHORT-SIDE-DIRECTION −2cm | (MEASURED VALUE− IDEAL VALUE) /IDEAL VALUE |
| 805 | RIGHT-ANGLE CORRECTION AMOUNT (FRONT SURFACE) | (S+T)/2 | 0cm | MEASURED VALUE |
| 806 | TRAPEZOIDAL CORRECTION AMOUNT (FRONT SURFACE) | ((B-D-F)-(B-H-J)) | 0cm | MEASURED VALUE |
| 807 | LEAD POSITION (BACK SURFACE) | (K+M)/2 | 1cm | MEASURED VALUE −IDEAL VALUE |
| 808 | SIDE POSITION (BACK SURFACE) | (N+R)/2 | 1cm | MEASURED VALUE −IDEAL VALUE |
| 809 | LONG-SIDE-DIRECTION MAGNIFICATION (BACK SURFACE) | ((B-L-N)+(B-P-R))/2 | PAPER SHEET LENGTH IN LONG-SIDE DIRECTION −2cm | (MEASURED VALUE− IDEAL VALUE) /IDEAL VALUE |
| 810 | SHORT-SIDE-DIRECTION MAGNIFICATION (BACK SURFACE) | ((A-K-O)+(A-M-Q))/2 | PAPER SHEET LENGTH IN SHORT-SIDE-DIRECTION −2cm | (MEASURED VALUE− IDEAL VALUE) /IDEAL VALUE |
| 811 | RIGHT-ANGLE CORRECTION AMOUNT (BACK SURFACE) | (U+V)/2 | 0cm | MEASURED VALUE |
| 812 | TRAPEZOIDAL CORRECTION AMOUNT (BACK SURFACE) | ((B-L-N)-(B-P-R)) | 0cm | MEASURED VALUE |

FIG. 8

FIG. 15A

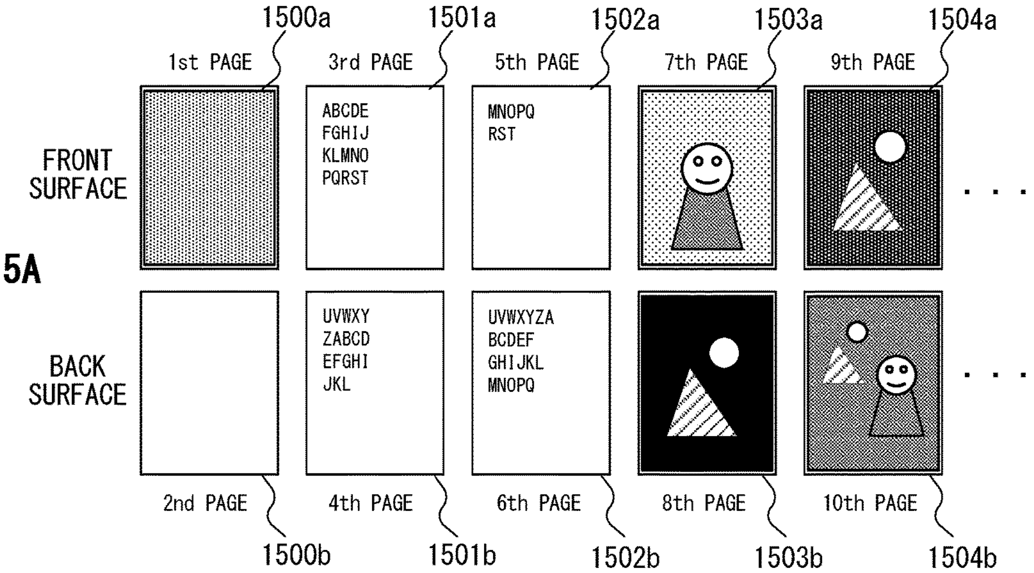

1520

| | TONER ADHESION AMOUNT CLASS 1 | TONER ADHESION AMOUNT CLASS 2 | TONER ADHESION AMOUNT CLASS 3 | TONER ADHESION AMOUNT CLASS 4 | TONER ADHESION AMOUNT CLASS 5 |
|---|---|---|---|---|---|
| IMAGE SIGNAL VALUE T [%] | 0 OR MORE AND LESS THAN 12.5 | 12.5 OR MORE AND LESS THAN 37.5 | 37.5 OR MORE AND LESS THAN 62.5 | 62.5 OR MORE AND LESS THAN 87.5 | 87.5 OR MORE |

FIG. 15B

FIG. 15C

1550

| PAGES (1560) | PRINT FRONT-AND-BACK POSITION CORRECTION EXECUTION PAGE FLAG Fp (1561) | IMAGES FOR ADJUSTMENT (1562) | |
|---|---|---|---|
| | | FRONT SURFACE (1562a) | BACK SURFACE (1562b) |
| PAGES 1 AND 2 | 0 | NONE | NONE |
| PAGES 3 AND 4 | 0 | NONE | NONE |
| PAGES 5 AND 6 | 0 | NONE | NONE |
| PAGES 7 AND 8 | 1 | TONER ADHESION AMOUNT CLASS 2 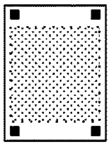 | TONER ADHESION AMOUNT CLASS 5 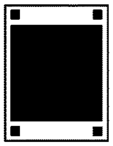 |
| PAGES 9 AND 10 | 1 | TONER ADHESION AMOUNT CLASS 4 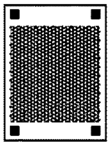 | TONER ADHESION AMOUNT CLASS 3 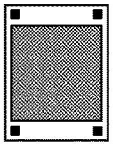 |
| ⋮ | ⋮ | ⋮ | ⋮ |

IMAGE FORMING APPARATUS

BACKGROUND OF THE INVENTION

Field of the Invention

The present disclosure relates to an image forming apparatus capable of performing duplex printing.

Description of the Related Art

For a printed matter to be printed by a commercial image forming apparatus, positions (printing positions) of an image to be printed on a front surface of a paper sheet and an image to be printed on a back surface of the paper sheet are required to be aligned with each other with high accuracy at a time of duplex printing. Thus, the image forming apparatus has a function (hereinafter referred to as "front-and-back position correction function") of aligning the printing positions of the images on the front surface and the back surface of the paper sheet by adjusting the printing positions at the time of duplex printing. The front-and-back position correction function of the image forming apparatus enables images to be printed so as not to overlap with ruled lines in a case where the images are printed on preprinted paper on which the ruled lines and the like have been printed in advance.

Front-and-back position correction that is performed by the front-and-back position correction function is required to be executed for each type of paper sheet on which images are to be printed. This is because an amount of expansion and contraction of a paper sheet varies depending on characteristics of the paper sheet, such as a size, a basis weight, and a material of the paper sheet. A paper sheet has an optimum correction amount for the front-and-back position correction varying depending on a difference in the amount of expansion and contraction of the paper sheet. The front-and-back position correction is performed by causing a reading apparatus to read a sheet for adjustment on which a mark (image for adjustment) for position detection has been printed on a paper sheet to be corrected, and detecting a deviation of the printing position based on a reading result of the image for adjustment.

The image forming apparatus detects the deviation of the printing position based on, for example, a length from a reference position to the mark which is obtained from a reading result of the sheet for adjustment. A correction amount for correcting the printing position is determined based on a detection result of the deviation of the printing position. In a case where printing processing is performed through use of a paper sheet having the same type as that of the paper sheet to be corrected, the image forming apparatus corrects the printing position based on the correction amount.

Factors of the deviation of the printing position on each of the front surface and the back surface at a time of printing involve not only a paper sheet type but also a toner adhesion amount of a toner image printed on the paper sheet. A difference in the toner adhesion amount exerts an influence on a paper sheet conveying force at a time of transferring the toner image onto the paper sheet. In a case where the toner adhesion amount is large, slippage due to toner occurs, thereby lowering the paper sheet conveying force, and a deviation of the printing position occurs in a direction of contraction with respect to a conveyance direction of the paper sheet.

In order to suppress the influence caused by the toner adhesion amount, an image forming apparatus as disclosed in United Status U.S. Pat. No. 11,178,290 determines the correction amount for the front-and-back position correction corresponding to the toner adhesion amount through use of the images for adjustment printed on a plurality of paper sheets having different toner adhesion amounts. Thus, even for printed matters having different toner adhesion amounts, the front-and-back position correction corresponding to the toner adhesion amounts is performed, to thereby improve correction accuracy.

In general, an image forming apparatus provided with a front-and-back position correction function includes a front-and-back position correction function (hereinafter referred to as "initial front-and-back position correction") of determining the correction amount corresponding to the type of paper sheet by performing, before execution of printing, the front-and-back position correction on a paper sheet to be used. However, even in a case where the printing position is corrected through use of the correction amount determined by the front-and-back position correction function, the correction accuracy of the printing position may deteriorate due to a temperature rise in the image forming apparatus caused by large-scale printing and a change in an image forming environment such as a change in a hygroscopic state of a paper sheet. For that reason, there is an image forming apparatus provided with a front-and-back position correction function (hereinafter referred to as "print front-and-back position correction") of maintaining the correction amount in a proper state by again performing the front-and-back position correction at predetermined page intervals during printing.

In the print front-and-back position correction that is performed during printing, in a case where an attempt is made to determine the correction amount corresponding to the toner adhesion amount, it is required to output the sheet for adjustment corresponding to the toner adhesion amount. FIG. 21 is an explanatory view of timings to output sheets for adjustment during printing. For example, in a case of performing the print front-and-back position correction on every 100 sheets in continuous printing of 300 sheets, the print front-and-back position correction is performed after the printing of the 100th sheet and the 200th sheet. At this time, in a case where five types of sheets for adjustment are required, the number of sheets to be paper to be discarded is 5×2=10. That is, as the number of sheets to be printed increases, the number of sheets of paper to be discarded by the print front-and-back position correction increases. In view of the above-mentioned problems, the present disclosure has a main object to provide an image forming apparatus that updates a correction amount for front-and-back position correction corresponding to a toner adhesion amount while reducing the number of sheets of paper to be discarded.

SUMMARY OF THE INVENTION

An image forming apparatus according to the present disclosure includes an image forming unit configured to form an image on a sheet through use of toner a reading unit configured to read the sheet on which a mark for correction is formed a display, and a controller configured to display a plurality of images included in a print job in a selectable manner on the display, acquire user selection information indicating a selection result for an image selected from among the plurality of images, determine, based on the user selection information, an image for adjustment to be formed by the image forming unit, the image for adjustment including a pattern image, which is to have a toner adhesion amount corresponding to a density of the selected image, and the mark for correction, control the image forming unit to form the image for adjustment on a sheet, control the reading unit to read the sheet on which the image for adjustment has been formed, and control a printing position of the selected image formed by the image forming unit based on a reading result of the sheet on which the image for adjustment read by the reading unit has been formed.

Further features of the present invention will become apparent from the following description of exemplary embodiments (with reference to the attached drawings).

BRIEF DESCRIPTION OF THE DRAWINGS

FIG. 7A and FIG. 7B are explanatory tables of a paper sheet library.

FIG. 8 is an explanatory table of calculation methods for printing position deviation amounts.

FIG. 15A, FIG. 15B, and FIG. 15C are explanatory views of a method of storing print adjustment page settings.

DESCRIPTION OF THE EMBODIMENTS

Now, referring to the accompanying drawings, description is given of at least one exemplary embodiment of the present disclosure.

Figure 1:
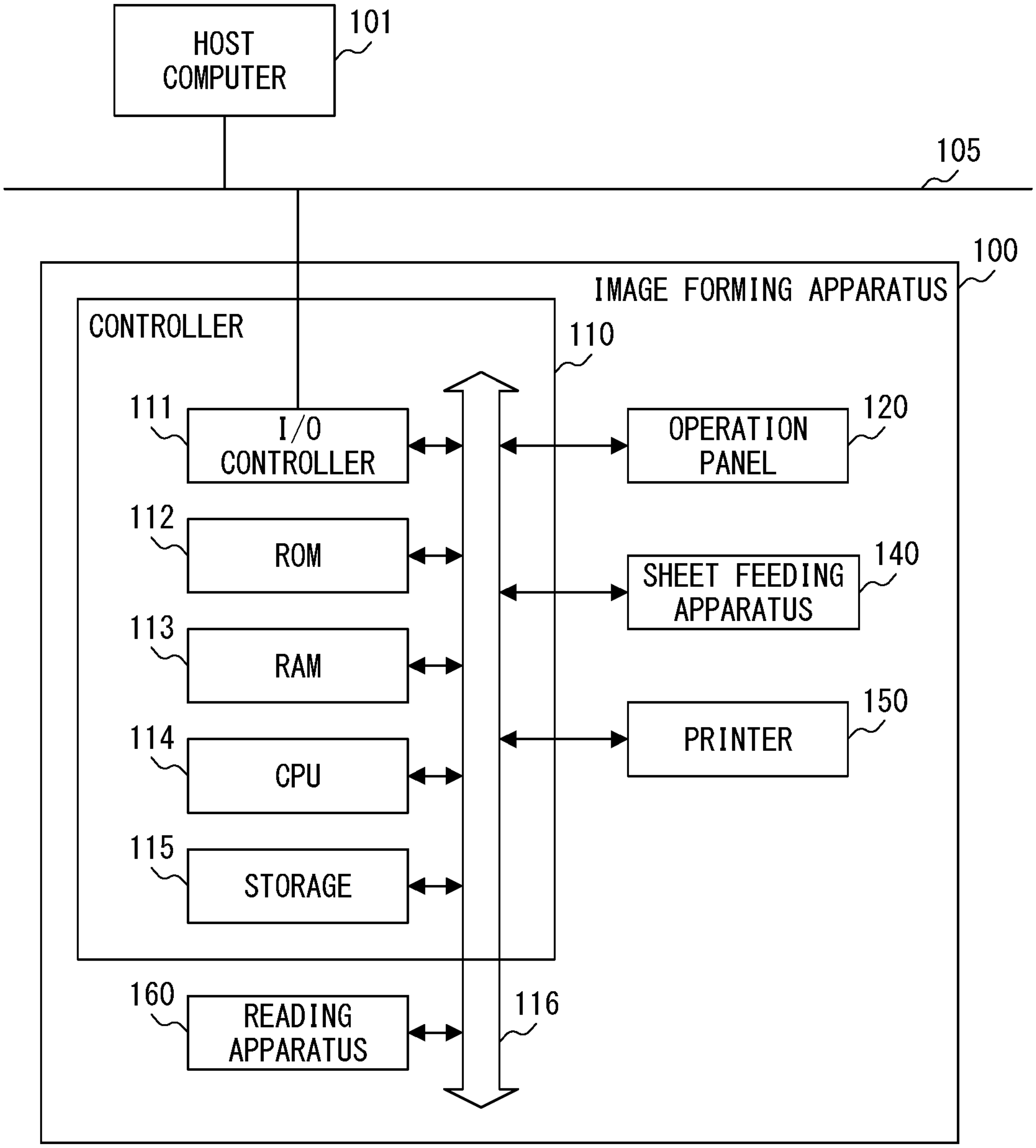
FIG. 1 is an overall configuration diagram of a printing system.

FIG. 1 is an overall configuration diagram of a printing system including an image forming apparatus according to the at least one embodiment. The printing system includes an image forming apparatus 100 and a host computer 101. The image forming apparatus 100 and the host computer 101 are connected to each other so as to enable communication therebetween through a network 105. The network 105 is, for example, a communication line such as a local area network (LAN) or a wide area network (WAN). A plurality of image forming apparatus 100 may be connected to the network 105, and a plurality of host computers 101 may also be connected to the network 105.

The host computer 101 is, for example, a server, and transmits a print job to the image forming apparatus 100 through the network 105. The print job includes various kinds of information required for printing, such as image data representing an image (output image) to be printed, a type of paper sheet used for printing, the number of sheets to be printed, and designation of duplex or simplex printing.

The image forming apparatus 100 includes a controller 110, an operation panel 120, a sheet feeding apparatus 140, a printer 150, and a reading apparatus 160. The image forming apparatus 100 prints an image on a paper sheet by the printer 150 based on the print job acquired from the host computer 101. The controller 110, the operation panel 120, the sheet feeding apparatus 140, the printer 150, and the reading apparatus 160 are connected to each other through a system bus 116 so as to enable communication therebetween.

The controller 110 controls each unit of the image forming apparatus 100. The operation panel 120 is a user interface including an input interface and an output interface. The input interface includes operation buttons and a numeric keypad. The output interface includes a display, such as a liquid crystal display (LCD), and a speaker. An operator can input a print job, a command, a print setting, and the like to the image forming apparatus 100 through the operation panel 120.

The controller 110 acquires the print job, the command, the print setting, and the like input through the operation panel 120. The operation panel 120 can display, under the control of the controller 110, various setting screens and a state of the image forming apparatus 100 on the display.

The sheet feeding apparatus 140 includes a plurality of sheet feeding stages that receive paper sheets. The sheet feeding apparatus 140 feeds one sheet at a time in order from the uppermost sheet of a paper sheet bundle that is a bundle of a plurality of paper sheets stacked on each sheet feeding stage. The sheet feeding apparatus 140 conveys, to the printer 150, the paper sheet fed from the sheet feeding stage.

The printer 150 generates a printed matter by printing an image (output image) on the paper sheet supplied from the sheet feeding apparatus 140 based on the image data. A specific configuration of the printer 150 is described later with reference to FIG. 2. The reading apparatus 160 is a reader, and reads the printed matter generated by the printer 150 to transmit a reading result thereof to the controller 110. A specific configuration of the reading apparatus 160 is described later with reference to FIG. 2.

The controller 110 is an information processing device including a read only memory (ROM) 112, a random access memory (RAM) 113, and a central processing unit (CPU) 114. The controller 110 further includes an I/O controller 111 and a storage 115. The storage 115 is a large capacity storage device such as a hard disk drive (HDD) or a solid state drive (SSD).

The I/O controller 111 is a communication interface which controls communication to/from the host computer 101 and another apparatus through the network 105. The ROM 112 is a storage device that stores various control programs. The storage 115 stores control programs and various kinds of data such as image data to be used for image forming processing (printing processing). The RAM 113 functions as a system work memory into which the control programs stored in the ROM 112 and the storage 115 are to be loaded. The CPU 114 executes the control programs loaded into the RAM 113 to centrally control the image forming apparatus 100. Modules included in the controller 110 are connected to each other through the system bus 116 so as to enable communication therebetween.

Figure 2:
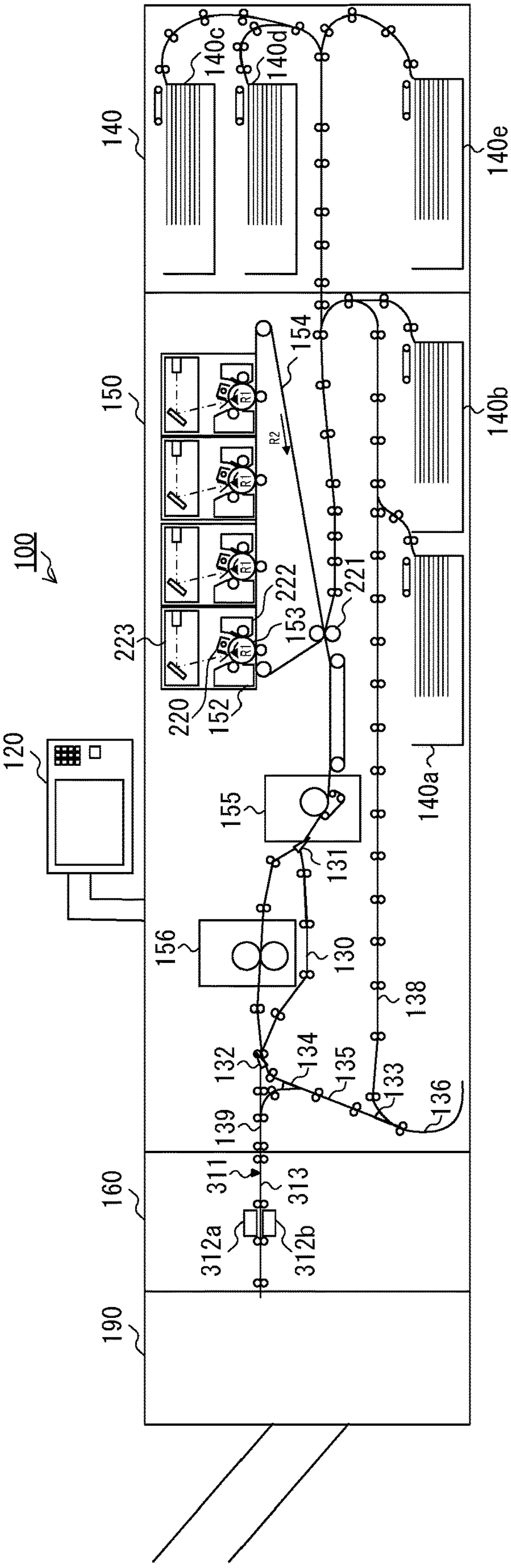
FIG. 2 is a configuration diagram of an image forming apparatus.

FIG. 2 is a configuration diagram of the image forming apparatus 100. The image forming apparatus 100 according to the at least one embodiment includes a finisher 190 in addition to the sheet feeding apparatus 140, the printer 150, and the reading apparatus 160, which have been described with reference to FIG. 1. The finisher 190 is a post-processing apparatus that performs predetermined post-processing on the printed matter generated by the printer 150. As the post-processing, the finisher 190 performs, for example, stapling processing on a plurality of printed matters or sorting processing on the printed matters.

The printer 150 includes a plurality of image forming units. In the at least one embodiment, four image forming units are provided in accordance with the number of colors of an image to be formed. The four image forming units are an image forming unit that forms a yellow image, an image forming unit that forms a magenta image, an image forming unit that forms a cyan image, and an image forming unit that forms a black image. The image forming units have substantially the same configurations.

One image forming unit includes a photosensitive drum 153, a charging device 220, an exposure device 223, and a developing device 152. The photosensitive drum 153 is a drum-shaped photosensitive member including a photosensitive layer on a surface thereof, and is rotated in a direction indicated by an arrow R1 by a motor (not shown). The charging device 220 charges the surface of the photosensitive drum 153. The exposure device 223 irradiates (or exposes) the charged surface of the photosensitive drum 153 with (or to) laser light modulated based on the image data. Thus, an electrostatic latent image is formed on the surface of the photosensitive drum 153. The developing device 152 develops the electrostatic latent image through use of a developer (toner). Thus, the electrostatic latent image on the surface of the photosensitive drum 153 is visualized, and an image (toner image) is formed on the photosensitive drum 153.

The printer 150 includes an intermediate transfer belt 154 onto which the toner images formed by the image forming units are to be transferred. The intermediate transfer belt 154 is rotated in a direction indicated by an arrow R2. The toner images of yellow, magenta, cyan, and black that have been formed by the respective image forming units are transferred onto the intermediate transfer belt 154 so as to overlap with each other at a timing corresponding to a rotation speed of the intermediate transfer belt 154. Thus, a full-color toner image is formed on the intermediate transfer belt 154. The toner image transferred onto the intermediate transfer belt 154 is conveyed in the direction indicated by an arrow R2, and is transferred onto the paper sheet fed from the sheet feeding apparatus 140 at a nip portion formed by the intermediate transfer belt 154 and a transfer roller 221.

The sheet feeding apparatus 140 includes a plurality of sheet feeding stages 140*a*, 140*b*, 140*c*, 140*d*, and 140*e* that receive paper sheets. Of the paper sheets, a paper sheet having a type designated by a print job is fed from any one of the sheet feeding stages 140*a*, 140*b*, 140*c*, 140*d*, and 140*e* in accordance with a timing at which each image forming unit starts forming an image. The fed paper sheet is conveyed to the nip portion formed by the intermediate transfer belt 154 and the transfer roller 221 with a timing being adjusted so that the toner image on the intermediate transfer belt 154 is transferred to a predetermined position.

The printer 150 includes a first fixing device 155 and a second fixing device 156 that apply heat and pressure to the toner image transferred onto the paper sheet to fix the image to the paper sheet. The first fixing device 155 includes a fixing roller including a heater in an inside thereof and a pressure belt for bringing the paper sheet into press contact with the fixing roller. The fixing roller and the pressure belt are driven by motors (not shown) to nip and convey the paper sheet. The second fixing device 156 is arranged downstream of the first fixing device 155 in a conveyance direction of the paper sheet. The second fixing device 156 is used for increasing a gloss of the image on the paper sheet that has passed through the first fixing device 155 and for ensuring fixability. The second fixing device 156 includes a fixing roller including a heater in an inside thereof and a pressure roller including a heater in an inside thereof. The fixing roller and the pressure roller are driven by motors (not shown) to nip and convey the paper sheet.

The second fixing device 156 is not used depending on the type of image to be printed (type thereof such as photograph, characters, or the like) and the type of paper sheet to be used for printing. In this case, the paper sheet that has passed through the first fixing device 155 is conveyed to a conveyance path 130 without being conveyed to the second fixing device 156. To that end, a flapper 131 that guides the paper sheet to any one of the conveyance path 130 and the second fixing device 156 is provided between the first fixing device 155 and the second fixing device 156.

The paper sheet that has passed through any one of the second fixing device 156 and the conveyance path 130 is conveyed to any one of a conveyance path 135 and a delivery path 139. To that end, a flapper 132 is provided at a point at which the path branches off to the conveyance path 135 and the delivery path 139. For example, in a duplex printing mode, the flapper 132 guides the paper sheet having an image printed on a first surface (front surface) thereof to the conveyance path 135, and guides the paper sheet having an image printed on both surfaces thereof to the delivery path 139. For example, in a face-up sheet delivery mode, the flapper 132 guides the paper sheet having an image printed on the front surface to the delivery path 139. For example, in a face-down sheet delivery mode, the flapper 132 guides the paper sheet having an image printed on the front surface to the conveyance path 135. Further, the flapper 132 guides the paper sheet having an image for adjustment, which is to be used for printing position adjustment, printed on the first surface (front surface) to the conveyance path 135 in order to print an image for adjustment, which is to be used for printing position adjustment, on a second surface (back surface) of the paper sheet.

The paper sheet guided to the conveyance path 135 is conveyed to a reverser 136. After a conveyance operation of the paper sheet conveyed to the reverser 136 has been temporarily stopped, the paper sheet is reversed in the conveyance direction. The paper sheet reversed in the conveyance direction is conveyed to any one of a conveyance path 138 and the conveyance path 135. A flapper 133 is provided at a branch portion between the conveyance path 138 and the conveyance path 135. The flapper 133 guides the paper sheet to any one of the conveyance path 138 and the conveyance path 135. For example, the flapper 133 guides the paper sheet reversed in the conveyance direction to the conveyance path 138 in the duplex printing mode, and guides the paper sheet reversed in the conveyance direction to the conveyance path 135 in the face-down sheet delivery mode. The paper sheet conveyed to the conveyance path 135 by the flapper 133 is guided to the delivery path 139 by the flapper 134. Further, in order to print the images for adjustment on the second surface (back surface) of the paper sheet, the flapper 133 guides the paper sheet reversed in the conveyance direction to the conveyance path 138.

The paper sheet conveyed to the conveyance path 138 by the flapper 133 is conveyed toward the nip portion between the intermediate transfer belt 154 and the transfer roller 221. The front and back of the paper sheet have been reversed by the reverser 136, and hence the paper sheet has a toner image transferred onto the second surface (back surface) while passing through the nip portion.

The reading apparatus 160 that reads an image for adjustment printed on a paper sheet is connected on downstream of the printer 150 in the conveyance direction of the paper sheet. The paper sheet having an image printed thereon is sent to the reading apparatus 160 through the delivery path 139 as a printed matter. The paper sheet (printed matter) supplied from the printer 150 to the reading apparatus 160 is conveyed along a conveyance path 313. The reading apparatus 160 includes a sheet detection sensor 311 and line sensors 312*a* and 312*b* along the conveyance path 313. The reading apparatus 160 uses the line sensors 312*a* and 312*b* to read the paper sheet having the image for adjustment printed thereon by the printer 150 while conveying the paper sheet along the conveyance path 313.

Details of the images for adjustment are described later. In the following description, a paper sheet having an image for adjustment printed thereon is referred to as "sheet for adjustment." In addition, a paper sheet having an image (output image designated by a print job) other than the image for adjustment printed thereon is also conveyed to the finisher 190 along the conveyance path 313.

The sheet detection sensor 311 is, for example, an optical sensor including a light-emitting element and a light-receiving element. The sheet detection sensor 311 detects a leading end of the sheet for adjustment in the conveyance direction, the sheet for adjustment being conveyed along the conveyance path 313. The controller 110 can determine a skew feed amount of the paper sheet based on a timing at which the leading end of the paper sheet is detected by the sheet detection sensor 311.

The line sensor 312*a* and the line sensor 312*b* are arranged at positions opposed to each other across the conveyance path 313. The line sensors 312*a* and 312*b* each read an image for adjustment on the sheet for adjustment. The images for adjustment are printed on, for example, both the front surface and the back surface of the paper sheet. While the paper sheet is being conveyed between the line sensor 312*a* and the line sensor 312*b*, the images for adjustment printed on both the surfaces are read at a time.

In a case of performing the printing position adjustment, the image forming apparatus 100 detects a deviation amount of a printing position (image forming position) of the image for adjustment from an ideal position based on each of reading results of the images for adjustment obtained by the line sensors 312*a* and 312*b*. The controller 110 controls the image forming processing based on the detected deviation amount of the printing position (image forming position) so that the printing position (image forming position) with respect to the paper sheet becomes the ideal position. Front-and-back position adjustment for adjusting the printing positions on the front surface and the back surface of the paper sheet is also performed based on results of the printing position adjustment.

The finisher 190 performs predetermined post-processing on the printed matter that has passed through the reading apparatus 160, and delivers the printed matter. At this time, the printed matter on which the output image designated by the print job has been printed is delivered after the post-processing, but the sheet for adjustment on which the image for adjustment has been printed is delivered without being subjected to the post-processing. The sheet for adjustment is delivered onto, for example, a delivery tray that is different from a delivery tray onto which to deliver the printed matter on which the output image has been printed.

<Image for Adjustment>

Figure 3:
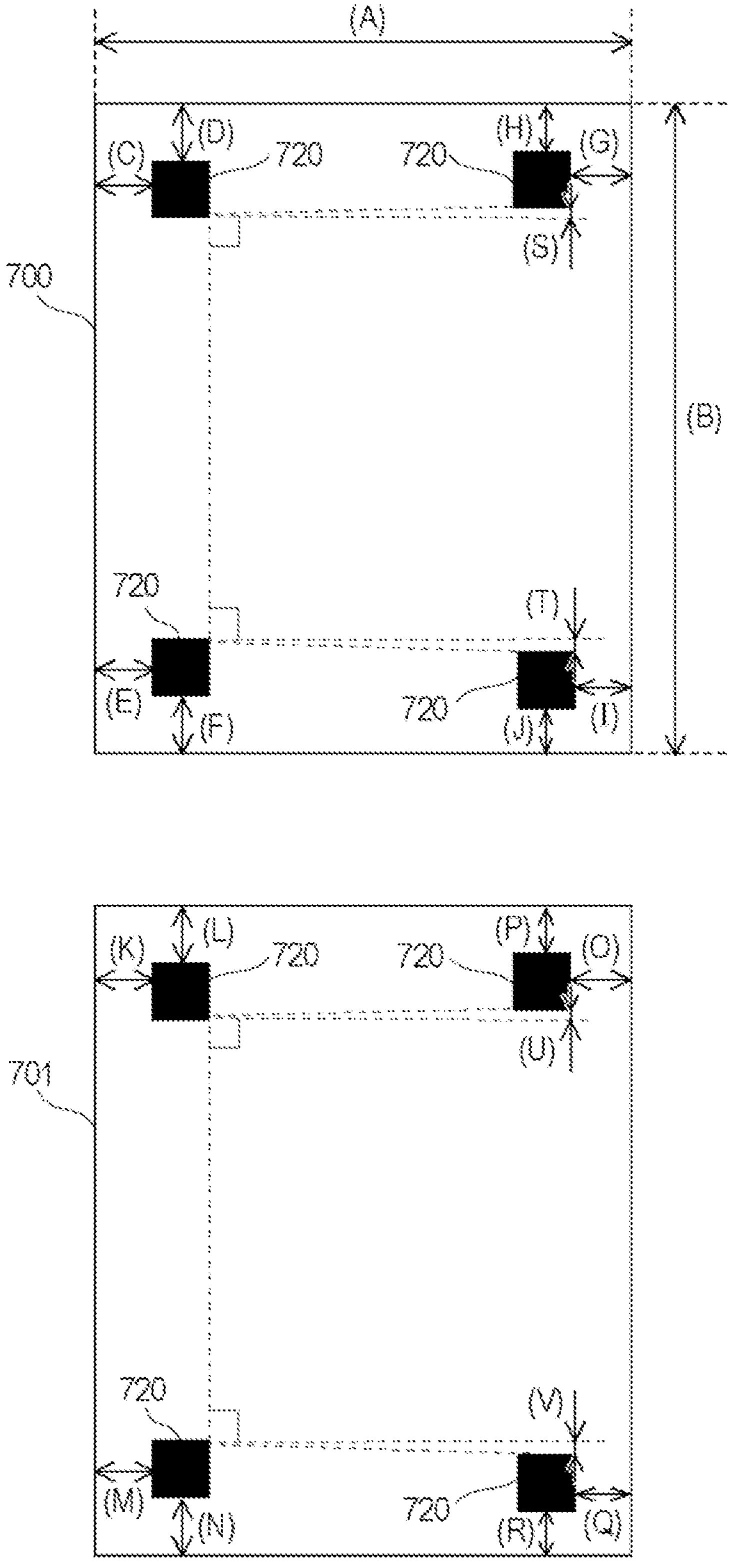
FIG. 3 is an explanatory view of images for adjustment.

FIG. 3 is an explanatory view of images for adjustment. The printer 150 prints an image 700 for adjustment on the front surface of the paper sheet, and prints an image 701 for adjustment on the back surface of the paper sheet. The images 700 and 701 for adjustment each include a plurality of marks 720 for correction. The marks 720 for correction are located in four corners (corner areas) of the paper sheet, and are each printed at a position spaced apart from a paper sheet end by a predetermined distance. The plurality of marks 720 for correction are formed through use of black toner at the same image density. Printing in black increases a difference between intensity of light reflected by the marks 720 for correction and intensity of light reflected by the paper sheet, and hence it is possible to detect contours of the marks 720 for correction with high accuracy from the reading result obtained by the reading apparatus 160.

In a case where the printing position is the ideal position, for each of the marks 720*a* for correction, a distance from the paper sheet end to the mark 720*a* is the predetermined distance. The controller 110 measures the positions of the marks 720 for correction on the paper sheet in order to detect the deviation amount of the printing position. The controller 110 measures a length (A) to a length (V) of FIG. 3 based on the reading results of the images for adjustment, which have been obtained by the reading apparatus 160.

The length (A) to the length (V) are measured as follows. The controller 110 causes the line sensors 312*a* and 312*b* to read the images for adjustment. The controller 110 detects the paper sheet ends and edges of the marks 720 for correction (boundaries between the paper sheet and the marks 720 for correction) based on differences in read values such as brightness values between the read images of the images for adjustment, which have been obtained by the line sensors 312*a* and 312*b*, and the paper sheet. The controller 110 counts the numbers of read pixels from the detected paper sheet ends to the detected edges of the marks 720 for correction, and measures the lengths (A) to (V) based on the count values.

The length (A) is a length of the sheet for adjustment in a short-side direction thereof, and the length (B) is a length of the sheet for adjustment in a long-side direction thereof. Ideal lengths of the length (A) and the length (B) are defined by a size of a paper sheet. The length (C) to the length (R) correspond to distances (lengths) from the paper sheet ends to the nearby marks 720 for correction.

A printing position deviation amount is calculated based on the length (A) to the length (V). However, according to experiments conducted by the inventor(s), it was found that a deformation amount of the paper sheet generated by the images for adjustment exemplified in FIG. 3 was different from a deformation amount of the paper sheet on which an output image corresponding to an actual print job had been printed. This is because the deformation amount of the paper sheet varies depending on a toner adhesion amount. The toner adhesion amount of the paper sheet on which the output image has been printed varies depending on the type of image. For example, in a case where a photographic image is printed on an entire surface of the paper sheet, the toner adhesion amount of the paper sheet is larger than the toner adhesion amount of the sheet for adjustment. For that reason, there is a fear that it is not possible to correct the printing position of the output image to the ideal position by the correction amount obtained from the printing position deviation amount measured through use of the sheet for adjustment on which only the marks 720 for correction have been printed.

In the at least one embodiment, another mark different from the marks 720 for correction is formed at a position that does not overlap with the marks 720 for correction, and the printing position adjustment is executed through use of an image for adjustment suitable for the toner adhesion amount of the paper sheet on which the output image has been printed in actuality. In the at least one embodiment, the toner adhesion amount of the paper sheet is classified into five classes, and images for adjustment corresponding to the respective toner adhesion amount classes are printed on sheets for adjustment. It is possible to calculate the printing position deviation amount even in a case where another mark is printed at the position that does not overlap with the marks 720 for correction.

Figure 4:
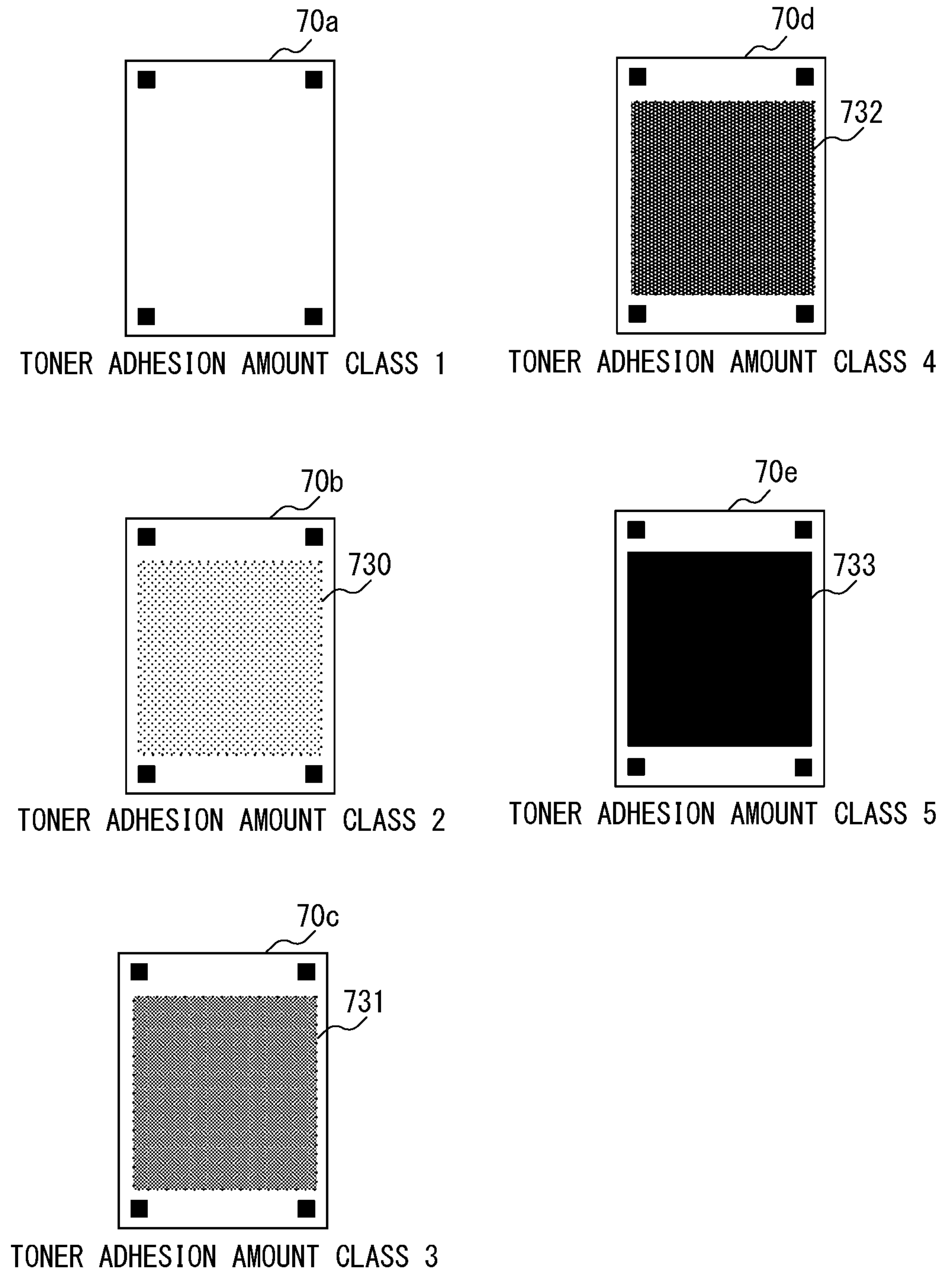
FIG. 4 is an explanatory view of images for adjustment for reproducing contraction of a paper sheet.

FIG. 4 is an explanatory view of images for adjustment for reproducing contraction of the paper sheet which occurs due to a difference in the toner adhesion amount. The image forming apparatus 100 performs the printing position adjustment through use of an image for adjustment suitable for the toner adhesion amount of the output image from among five types of images 70*a*, 70*b*, 70*c*, 70*d*, and 70*e* for adjustment having different image densities, which are illustrated in FIG. 4. The toner adhesion amounts (image densities) of the images 70*a* to 70*e* for adjustment are the toner adhesion amounts corresponding to the toner adhesion amount classes 1 to 5, respectively. Data on the image for adjustment for causing the printer 150 to print the images 70*a*, 70*b*, 70*c*, 70*d*, and 70*e* for adjustment is stored in advance in the storage 115. The images for adjustment that correspond to each toner adhesion amount are not required to be limited to five types as long as the image densities are different.

Only the marks 720 for correction are formed in the image 70*a* for adjustment. The image 70*b* for adjustment includes the marks 720 for correction and a rectangular mark 730. The mark 730 is formed at a position different from those of the mark 720 for correction so as not to overlap with the marks 720 for correction. The mark 730 is a toner image formed based on an image signal value of 25%. The image 70*c* for adjustment includes the marks 720 for correction and a rectangular mark 731. The mark 731 is formed at a position different from those of the mark 720 for correction so as not to overlap with the marks 720 for correction. The mark 731 is a toner image formed based on an image signal value of 50%. The image 70*d* for adjustment includes the marks 720 for correction and a rectangular mark 732. The mark 732 is formed at a position different from those of the mark 720 for correction so as not to overlap with the marks 720 for correction. The mark 732 is a toner image formed based on an image signal value of 75%. The image 70*e* for adjustment includes the marks 720 for correction and a rectangular mark 733. The mark 733 is formed at a position different from those of the mark 720 for correction so as not to overlap with the marks 720 for correction. The mark 733 is a toner image formed based on an image signal value of 100%.

The marks 730, 731, 732, and 733 are images having the same area. The marks 730, 731, 732, and 733 are formed based on mutually different image signal values, and therefore have mutually different image densities. The image densities of the respective marks 730, 731, 732, and 733 become higher in an order of the mark 730 having the lowest image density, the mark 731, the mark 732, and the mark 733. Thus, the image 70*e* for adjustment has the largest toner adhesion amount among the images 70*a*, 70*b*, 70*c*, 70*d*, and 70*e* for adjustment. The image 70*a* for adjustment has the smallest toner adhesion amount among the images 70*a*, 70*b*, 70*c*, 70*d*, and 70*e* for adjustment. The marks 730, 731, 732, and 733 are each a pattern image supposed to have a toner adhesion amount determined in advance. The shape of the marks 730, 731, 732, and 733 is not limited to a rectangular shape, and may be any shape.

<Paper Sheet Library>

Paper sheets usable by the image forming apparatus 100 are managed by a database. This database is referred to as "paper sheet library." The paper sheet library is stored in, for example, the host computer 101 (server) connected to the image forming apparatus 100 or the storage 115. Information on each paper sheet stored in the paper sheet library is read out therefrom or written thereto as required.

Figure 5:
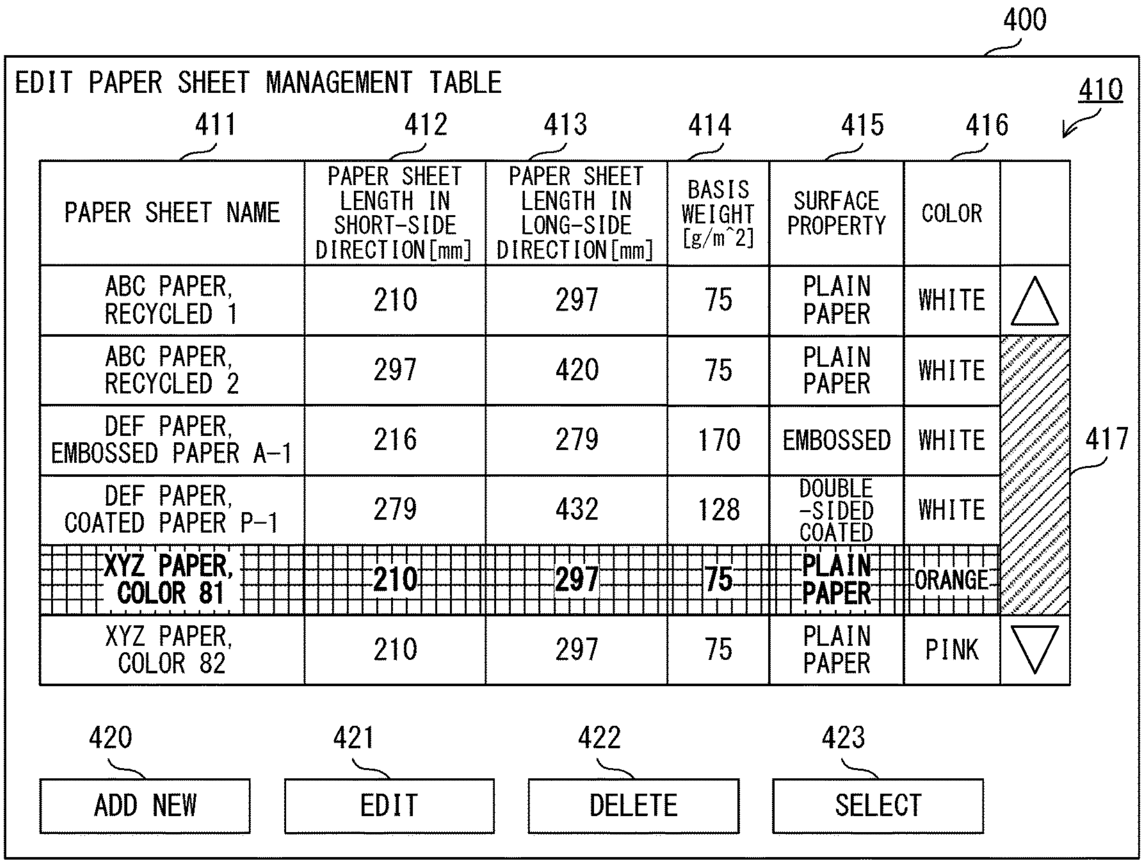
FIG. 5 is an exemplary view of an edit screen.

FIG. 5 is an exemplary view of an edit screen for the operator to edit the information on the paper sheet stored in the paper sheet library. An edit screen 400 therefor is displayed on the operation panel 120 of the image forming apparatus 100. The edit screen 400 includes a paper sheet list 410, an add new button 420, an edit button 421, a delete button 422, and a select button 423.

A list of paper sheets managed by a paper sheet library 600 is displayed in the paper sheet list 410. Attribute information indicating characteristics of each paper sheet is displayed in columns 411 to 416. A paper sheet name is displayed in the column 411. The paper sheet name is information set by the operator so that the operator can identify the type of paper sheet. A paper sheet size is displayed in the columns 412 and 413. A paper sheet length in the short-side direction is displayed in the column 412, and a paper sheet length in the long-side direction is displayed in the column 413. A basis weight of the paper sheet is displayed in the column 414.

Information for the operator to identify a surface property of the paper sheet is displayed in the column 415. The information for the operator to identify the surface property of the paper sheet is information on a physical characteristic of a paper sheet surface. For example, the paper sheet displayed as "DOUBLE-SIDED COATED" in the column 415 refers to a paper sheet subjected to surface treatment for increasing glossiness. For example, the paper sheet displayed as "EMBOSSED" in the column 415 refers to a paper sheet subjected to unevenness processing. For example, the paper sheet displayed as "PLAIN PAPER" in the column 415 refers to a paper sheet that has not been subjected to special processing. A color of the paper sheet is displayed in the column 416.

To edit the information on the paper sheet, the operator selects a paper sheet (paper sheet name) for which the information is to be edited from the paper sheet list 410 displayed on the operation panel 120. A method of displaying the selected paper sheet is changed so that the selected paper sheet can be distinguished from unselected paper sheets. For example, the selected paper sheet is displayed brighter than the unselected paper sheets. In a case where "XYZ PAPER, COLOR 81" is selected, as exemplified in FIG. 5, a row of "XYZ PAPER, COLOR 81" is displayed by a method different from a method of displaying rows of the other unselected paper sheets. In a case where the number of paper sheets managed in the paper sheet library is larger than the number of paper sheets that can be displayed in the paper sheet list 410 at a time, the operator can select another sheet by operating a scroll bar 417.

The add new button 420 is a button for newly adding information on the paper sheet to the paper sheet library 600. The edit button 421 is a button for editing the information on the paper sheet selected by the operator from the paper sheet list 410. The delete button 422 is a button for deleting the paper sheet selected by the operator in the paper sheet list 410 from the paper sheet library 600. The select button 423 is a button for associating the paper sheet selected from the paper sheet list 410 with the sheet feeding stage.

Figure 6:
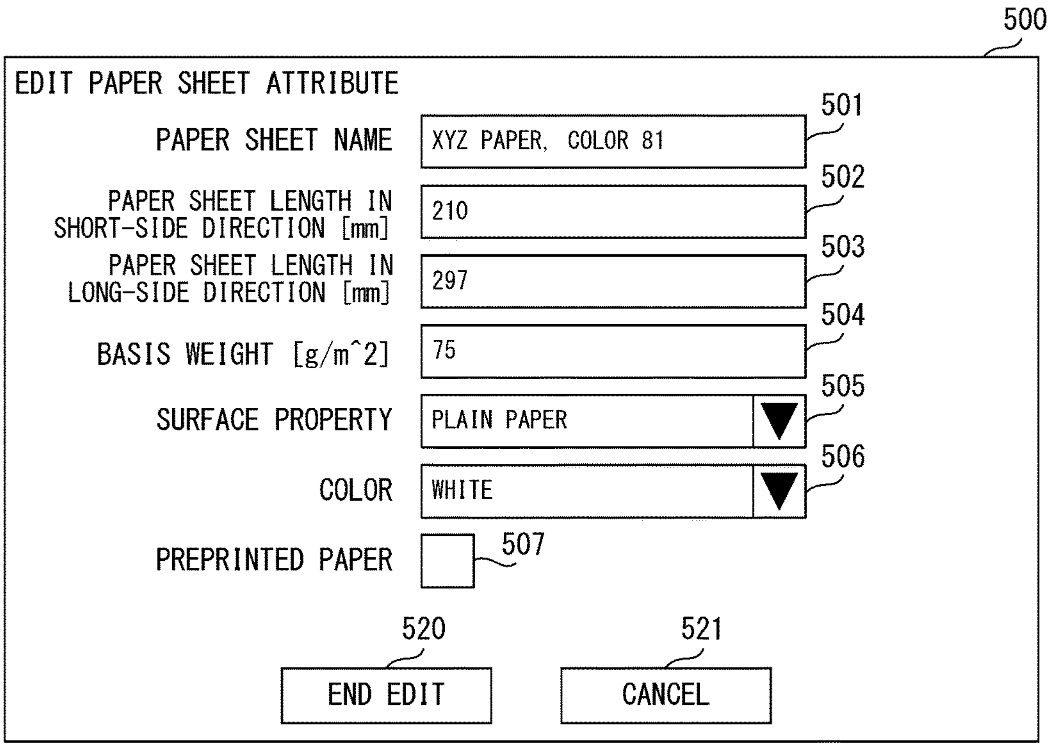
FIG. 6 is an exemplary view of a paper sheet attribute edit screen.

In a case where the add new button 420 or the edit button 421 on the edit screen 400 is pressed, a paper sheet attribute edit screen for inputting information on a paper sheet is displayed on the operation panel 120. FIG. 6 is an exemplary view of the paper sheet attribute edit screen. A paper sheet attribute edit screen 500 includes text boxes 501 to 504, combo boxes 505 and 506, a checkbox 507, an end edit button 520, and a cancel button 521.

The text box 501 is an input area for the paper sheet name. The text box 502 is an input area for the paper sheet length in the short-side direction. The text box 503 is an input area for the paper sheet length in the long-side direction. The text box 504 is an input area for the basis weight of the paper sheet. The input to each of the text boxes 501 to 504 is performed by a software keyboard or the operation panel 120.

The combo box 505 is an area for designating the surface property of the paper sheet. The operator designates the surface property of the paper sheet from among a plurality of types of surface properties. Information on the plurality of types of surface properties is registered in advance, and is designated from a list displayed in a pull-down manner. The combo box 506 is an area for designating the color of the paper sheet. The operator designates the color of the paper sheet from among a plurality of colors. Information on the plurality of colors is registered in advance, and is designated from a list displayed in a pull-down manner. The checkbox 507 is a designation area for designating whether or not the paper sheet is preprinted paper. In a case where the paper sheet is preprinted paper, the operator checks the checkbox 507.

The end edit button 520 is a button for saving the information on the paper sheet, which has been input to the paper sheet attribute edit screen 500, to the paper sheet library 600. In a case where the end edit button 520 is pressed, the information on the paper sheet that has been input up to that time point is saved to the paper sheet library 600. After the information on the paper sheet has been saved to the paper sheet library 600, the paper sheet attribute edit screen 500 is switched to the edit screen 400 of FIG. 5. The cancel button 521 is a button for transitioning to the edit screen 400 of FIG. 5 without saving the information on the paper sheet, which has been input to the paper sheet attribute edit screen 500, to the paper sheet library 600. In a case where the cancel button 521 is pressed, the editing of the information on the paper sheet is canceled.

FIG. 7A and FIG. 7B are explanatory tables of the paper sheet library. The paper sheet library 600 is saved as digital information. The digital information as used herein refers to information described through use of, for example, extensible markup language (XML) or comma-separated values (CSV).

Rows 601 to 605 indicate the information on paper sheets registered in the paper sheet library 600. Columns 611 to 627 indicate sheet attributes. The column 611 indicates a name of each paper sheet. The columns 612 to 615 indicate the physical characteristic of the paper sheet. The column 612 indicates the paper sheet length in the short-side direction of the paper sheet, the column 613 indicates the paper sheet length in the long-side direction of the paper sheet, the column 614 indicates the basis weight of the paper sheet, and the column 615 indicates the surface property of the paper sheet. The column 616 indicates the color of the paper sheet. The column 617 indicates whether or not the paper sheet is preprinted paper.

The columns 618 to 627 each indicate a printing position deviation amount on the front surface or the back surface of the paper sheet. The printing position deviation amount is a value that quantitatively represents a deviation between a predicted printing area, which has been predicted from the reading result of the image for adjustment, and an ideal printing area. In the at least one embodiment, the toner adhesion amount of the image to be printed on the paper sheet is divided into five toner adhesion amount classes, and printing position deviation amounts obtained at times of printing images belonging to the respective toner adhesion amount classes are stored.

The columns 618 and 619 indicate the printing position deviation amounts on the front surface and the back surface that are obtained in a case where an adhesion amount of toner to be printed on the paper sheet belongs to a toner adhesion amount class 1. The columns 620 and 621 indicate the printing position deviation amounts on the front surface and the back surface that are obtained in a case where an adhesion amount of toner to be printed on the paper sheet belongs to a toner adhesion amount class 2. The columns 622 and 623 indicate the printing position deviation amounts on the front surface and the back surface that are obtained in a case where an adhesion amount of toner to be printed on the paper sheet belongs to a toner adhesion amount class 3. The columns 624 and 625 indicate the printing position deviation amounts on the front surface and the back surface that are obtained in a case where an adhesion amount of toner to be printed on the paper sheet belongs to a toner adhesion amount class 4. The columns 626 and 627 indicate the printing position deviation amounts on the front surface and the back surface that are obtained in a case where an adhesion amount of toner to be printed on the paper sheet belongs to a toner adhesion amount class 5.

The ideal printing area is a rectangle with four sides having lengths determined in advance, one side of the printing area is parallel to a predetermined side of the paper sheet, and a distance between a predetermined side of the paper sheet and one side of the printing area parallel to the predetermined side is a predetermined distance.

The printing position deviation amount is represented by parameters such as, for example, a right-angle correction amount, a trapezoidal correction amount, a lead position, a side position, a long-side-direction magnification, and a short-side-direction magnification. The right-angle correction amount represents an amount of deviation of any corner of the printing area from a right angle. For example, the right-angle correction amount is the amount of deviation between an ideal perpendicular and a straight line printed in the short-side direction of the printing area, the ideal perpendicular being calculated with respect to a straight line printed in the long-side direction of the printing area. The trapezoidal correction amount represents an amount of deviation due to expansion and contraction of the paper sheet. For example, the trapezoidal correction amount is the amount of deviation between a straight line printed from a printing start position on the paper sheet to a short-side-direction trailing end along the short-side direction and a straight line printed from a position in a long-side-direction trailing end of the paper sheet to the short-side-direction trailing end along the short-side direction.

The lead position represents a printing position deviation amount in the short-side direction with respect to the paper sheet. The side position represents a printing position deviation amount in the long-side direction with respect to the paper sheet. The lead position is adjusted by changing a printing start position of the image with the leading end of the paper sheet being set as a starting point in the conveyance direction. The side position is adjusted by changing a printing start position of the image with an end portion of the paper sheet parallel to the conveyance direction being set as a starting point. Specifically, the lead position and the side position are adjusted by adjusting a laser light irradiation start timing for the exposure device 223 to start to irradiate the photosensitive drum 153 with laser light. For example, the CPU 114 controls the exposure device 223 to adjust the laser light irradiation start timing.

The short-side-direction magnification represents a deviation (magnification) of a length of an actual printing area in the short-side direction from an ideal length in the short-side direction. Specifically, the short-side-direction magnification is adjusted by controlling a rotation speed of the photosensitive drum 153 or the rotation speed of the intermediate transfer belt 154. For example, the CPU 114 adjusts a magnification in the short-side direction by adjusting a rotation speed of a motor (not shown) that rotates the photosensitive drum 153 or a motor (not shown) that rotates the intermediate transfer belt 154.

The long-side-direction magnification represents a deviation (magnification) of a length of an actual printing area in the long-side direction from an ideal length in the long-side direction. Specifically, the long-side-direction magnification is adjusted by controlling a clock frequency of the laser light in a case where the exposure device 223 modulates the laser light based on the image data. For example, the CPU 114 controls the exposure device 223 to control the clock frequency. In another case, the CPU 114 may perform image processing on the image data so that the printing position of the output image becomes an ideal printing position. Image processing for causing the printing position of the output image to become an ideal printing position is image processing such as, for example, affine transformation.

In a case where an output image is printed on a paper sheet based on a print job, the controller 110 adjusts the printing position based on the printing position deviation amount so that the image is to be printed at an ideal position on the paper sheet. The controller 110 refers to the printing position deviation amount in the paper sheet library 600 to perform the image processing on the image data so that the printing position becomes an ideal printing position. The controller 110 controls the printer 150 to print the image on the paper sheet based on the image data subjected to image processing.

An initial value of each item of the printing position deviation amount is "0". In a case where a paper sheet is newly registered in the paper sheet library 600 or in a case where the paper sheet has been registered but the printing position adjustment has not been performed, the initial value is used as the printing position deviation amount.

FIG. 8 is an explanatory table of calculation methods for printing position deviation amounts. The printing position deviation amounts are obtained based on actually measured values of the length (A) to the length (V) (see FIG. 3), the values having been measured from the reading result of the image for adjustment.

The items 801 to 812 are items each of which indicates the printing position deviation amount. The parameters of the printing position deviation amounts obtained from the image 700 for adjustment include a lead position 801, a side position 802, a long-side-direction magnification 803, a short-side-direction magnification 804, a right-angle correction amount 805, and a trapezoidal correction amount 806. The parameters of the printing position deviation amounts obtained from the image 701 for adjustment include a lead position 807, a side position 808, a long-side-direction magnification 809, a short-side-direction magnification 810, a right-angle correction amount 811, and a trapezoidal correction amount 812.

Measured values 820 of the image 700 for adjustment and the image 701 for adjustment are calculated based on the same calculation formula for each type of parameter, and printing position deviation amounts 822 of the image 700 for adjustment and the image 701 for adjustment are calculated based on the same calculation formula for each type of parameter. The same ideal value is set for the same type of parameter of the image 700 for adjustment and the image 701 for adjustment. The measured values 820 are calculated from the actually measured values of the lengths (A) to (V) illustrated in FIG. 3 based on the calculation formula set for each item.

The measured value 820 of the lead position 801 (807) corresponds to an average value of distances C and E (K and M) from a leading end portion of the paper sheet in the conveyance direction to the nearby marks 720 for correction 720. The measured value 820 of the side position 802 (808) corresponds to an average value of distances F and J (N and R) from an end portion of the paper sheet on the left side when viewed along the conveyance direction of the paper sheet in FIG. 3 to the nearby marks 720 for correction.

The measured value 820 of the long-side-direction magnification 803 (809) corresponds to an average value of distances between the marks 720 for correction aligned on the same line in the long-side direction. The measured value 820 of the short-side-direction magnification 804 (810) corresponds to an average value of distances between the marks 720 for correction aligned on the same line in the short-side direction.

The measured value 820 of the right-angle correction amount 805 (811) corresponds, in a case where a perpendicular of a straight line connecting the marks 720 for correction on the leading end side of the paper sheet in the conveyance direction is used as a reference line, to an average value of deviation amounts S and T (U and V) of the mark for correction on the trailing end side of the paper sheet in the conveyance direction from the reference line in the long-side direction. The measured value 820 of the trapezoidal correction amount 806 (812) corresponds to a difference between a distance between the marks 720 for correction aligned on the leading end side of the paper sheet in the conveyance direction and a distance between the marks 720 for correction aligned on the trailing end side of the paper sheet in the conveyance direction.

A column 821 indicates an ideal value of each corresponding item. The marks 720 for correction are each ideally printed at a position spaced apart from each corresponding paper sheet end by the ideal value. The ideal values of the lead position and the side position are, for example, 1 cm. The ideal value of the long-side-direction magnification is, for example, a length of 2 cm shorter than the paper sheet length in the long-side direction of the paper sheet registered in the paper sheet library 600. The ideal value of the short-side-direction magnification is, for example, a length of 2 cm shorter than the paper sheet length in the short-side direction of the paper sheet registered in the paper sheet library 600.

A column 822 indicates a calculation formula for calculating a final printing position deviation amount of each item based on the measured value 820 and the ideal value 821. The printing position deviation amount of each of the lead position and the side position is calculated (in mm) by subtracting the ideal value from the measured value. The printing position deviation amount of each of the long-side-direction magnification and the short-side-direction magnification is calculated (in %) by dividing a value obtained by subtracting an ideal value from a measured value by the ideal value. The measured value of each of the right-angle correction amount and the trapezoidal correction amount is directly used as the correction amount. The calculated printing position deviation amounts are each saved to the paper sheet library 600 (see FIG. 7A and FIG. 7B).

<Paper Sheet Type Setting>

Figure 9:
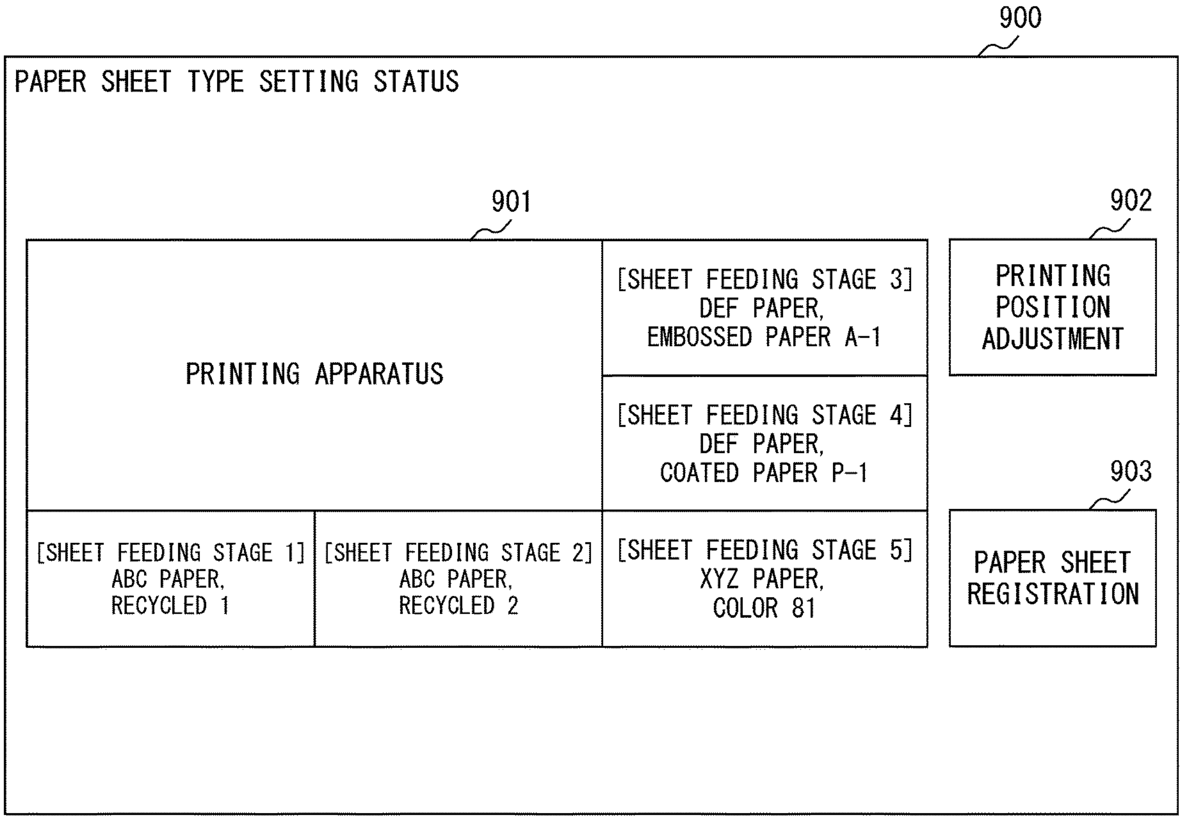
FIG. 9 is an exemplary view of a paper sheet type setting screen.

FIG. 9 is an exemplary view of a paper sheet type setting screen 900 displayed on the operation panel 120. The paper sheet type setting screen 900 includes a sheet setting status 901 of sheet feeding stages, a printing position adjustment button 902, and a paper sheet registration button 903. In the sheet setting status 901 of the sheet feeding stages, a paper sheet type registered for each of the sheet feeding stages (sheet feeding stages 140*a* to 140*e*) are displayed. In FIG. 9, a sheet feeding stage 1 corresponds to the sheet feeding stage 140*a*, a sheet feeding stage 2 corresponds to the sheet feeding stage 140*b*, a sheet feeding stage 3 corresponds to the sheet feeding stage 140*c*, a sheet feeding stage 4 corresponds to the sheet feeding stage 140*d*, and a sheet feeding stage 5 corresponds to the sheet feeding stage 140*e*.

In FIG. 9, "ABC PAPER, RECYCLED 1" is registered for the sheet feeding stage 140*a*. "ABC PAPER, RECYCLED 2" is registered for the sheet feeding stage 140*b*. "DEF PAPER, EMBOSSED PAPER A-1" is registered for the sheet feeding stage 140*c*. "DEF PAPER, COATED PAPER P-1" is registered for the sheet feeding stage 140*d*. "XYZ PAPER, COLOR 81" is registered for the sheet feeding stage 140*e*.

The printing position adjustment button 902 is a button for transitioning to a printing position adjustment screen described later. The paper sheet registration button 903 is a button for registering the paper sheet type for the selected sheet feeding stage. In a case where the paper sheet registration button 903 is pressed, the edit screen 400 for the paper sheet library of FIG. 5 is displayed. In a case where the select button 423 on the edit screen 400 for the paper sheet library is pressed, the paper sheet selected on the edit screen 400 for the paper sheet library is registered for the sheet feeding stage selected by the operator. The printing position adjustment button 902 and the paper sheet registration button 903 cannot be pressed in a case where no sheet feeding stage is selected in the sheet setting status 901 of the sheet feeding stages.

Figure 10A:
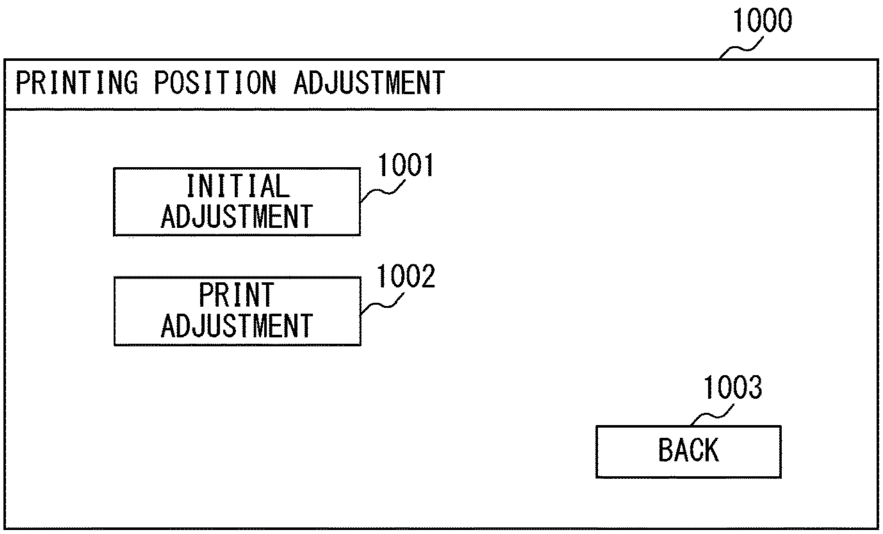
FIG. 10A, FIG. 10B, and FIG. 10C are exemplary views of a printing position adjustment screen.
Figure 10B:
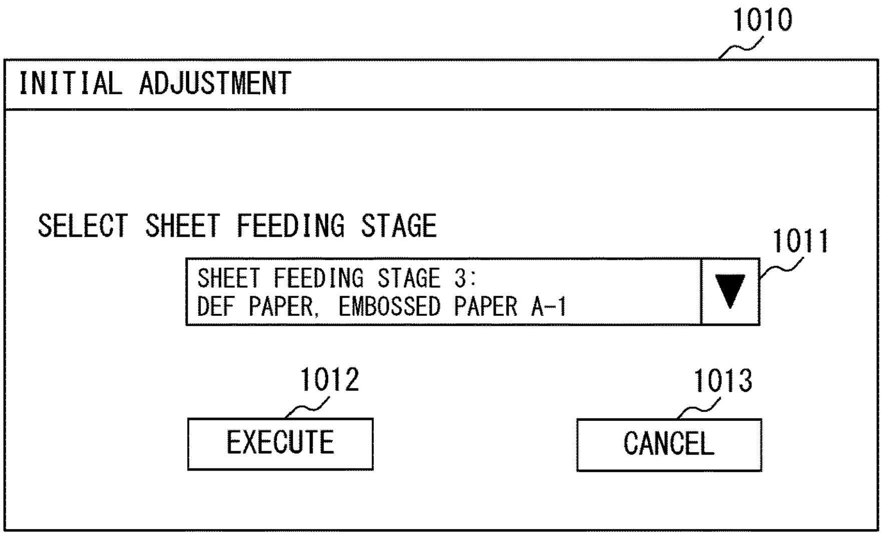
Figure 10C:
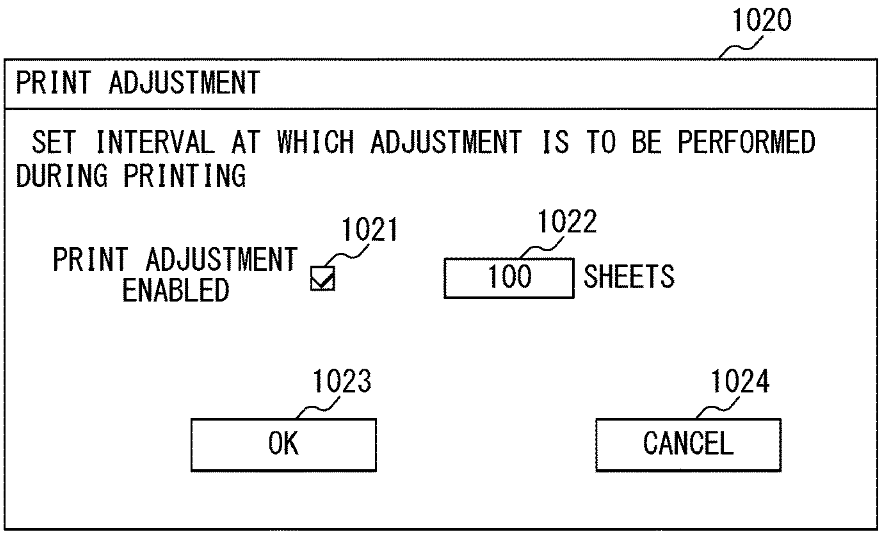

FIG. 10A to FIG. 10C are exemplary views of the printing position adjustment screen displayed on the operation panel 120. FIG. 10A is the printing position adjustment screen displayed in a case where the printing position adjustment button 902 on the paper sheet type setting screen 900 is pressed. A printing position adjustment screen 1000 includes an initial adjustment button 1001, a print adjustment button 1002, and a back button 1003. The initial adjustment button 1001 is a button for transitioning to an initial adjustment screen 1010 of FIG. 10B. The print adjustment button 1002 is a button for transitioning to a print adjustment screen 1020 of FIG. 10C. The back button 1003 is a button for transitioning to the paper sheet type setting screen 900 of FIG. 9.

The initial adjustment screen 1010 of FIG. 10B, which is displayed by pressing the initial adjustment button 1001, includes a sheet feeding stage selection box 1011, an execute button 1012, and a cancel button 1013. The sheet feeding stage selection box 1011 is a combo box for designating the sheet feeding stage. In the at least one embodiment, the sheet feeding stage selection box 1011 enables selection from among five sheet feeding stages from the sheet feeding stage 1 to the sheet feeding stage 5, which are illustrated in FIG. 9. The paper sheet type registered for the sheet feeding stage is also displayed in the sheet feeding stage selection box 1011.

The execute button 1012 is a button for performing initial front-and-back position correction described later on paper sheets on the sheet feeding stage selected by the sheet feeding stage selection box 1011 through use of the images 70*a* to 70*e* for adjustment of FIG. 4. The controller 110 starts processing for the initial front-and-back position correction in a case where the execute button 1012 is pressed. The cancel button 1013 is a button for canceling the initial front-and-back position correction. In a case where the cancel button 1013 is pressed, the processing for the initial front-and-back position correction is canceled, and the display returns to the printing position adjustment screen 1000.

The print adjustment screen 1020 of FIG. 10C, which is displayed by pressing the print adjustment button 1002, includes a print adjustment enabling checkbox 1021, a number-of-sheets setting box 1022, an OK button 1023, and a cancel button 1024. The print adjustment enabling checkbox 1021 is a checkbox for switching between enabled and disabled states of print front-and-back position correction described later. The number-of-sheets setting box 1022 is a text box for inputting the number of sheets to be printed, which serves as an interval at which the print front-and-back position correction is to be performed.

In a case where the print adjustment enabling checkbox 1021 is checked, the print front-and-back position correction is performed each time the number of sheets set in the number-of-sheets setting box 1022 has been printed. The print front-and-back position correction is a function of maintaining the correction amount in an appropriate state by again performing the front-and-back position correction at predetermined page intervals during printing. Each time the printer 150 has generated a predetermined number of printed matters, the correction amount for correcting the printing position is adjusted by the print front-and-back position correction. In a case where the print adjustment enabling checkbox 1021 is not checked, the print front-and-back position correction is not to be performed. In a case where the OK button 1023 is pressed, print adjustment setting is saved to the RAM 113, and the display returns to the printing position adjustment screen 1000. In a case where the cancel button 1024 is pressed, the print adjustment setting is not saved, and the display returns to the printing position adjustment screen 1000.

<Initial Front-and-Back Position Correction>

Figure 11:
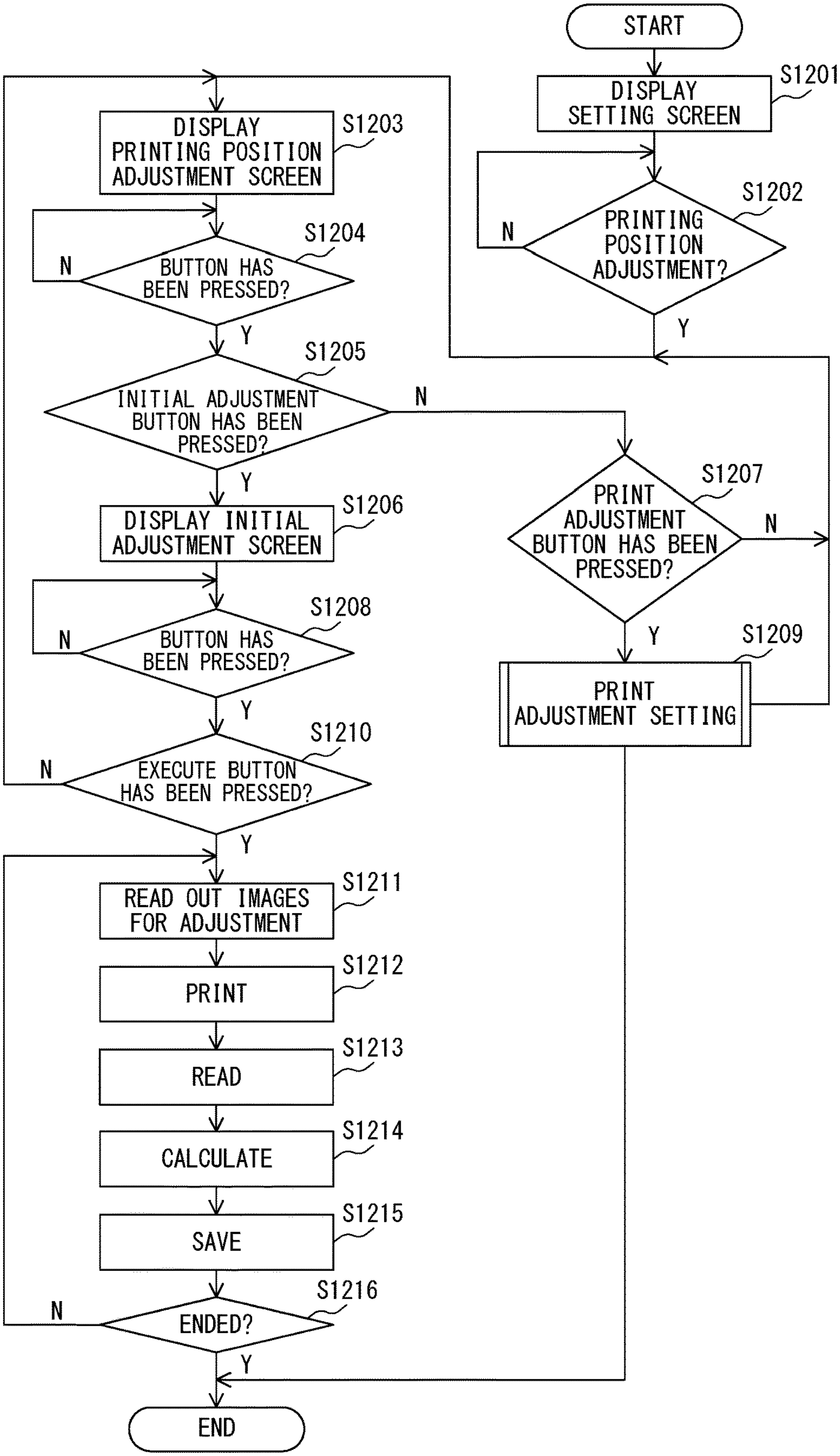
FIG. 11 is a flow chart for illustrating initial front-and-back position correction processing.

FIG. 11 is a flow chart for illustrating initial front-and-back position correction processing. Control in each step of this flow chart is implemented by the CPU 114 reading out and executing the program stored in the ROM 112. In the initial front-and-back position correction, correction amounts of printing position deviation amounts for each toner adhesion amount are calculated through use of a plurality of sheets for adjustment that are generated by printing the five types of images 70*a* to 70*e* for adjustment illustrated in FIG. 4 on the paper sheets on the sheet feeding stage selected by the operator. Thus, an amount of printing position deviation generated on an actual printed matter can be obtained with high accuracy, and a correction amount of a printing position suitable for an output image to be actually printed by a print job can be obtained. This processing is performed prior to a start of a print job.

In a case where the operator uses the operation panel 120 to make a request to display the paper sheet type setting screen 900 of FIG. 9, the CPU 114 displays the paper sheet type setting screen 900 on the operation panel 120 (Step S1201). The CPU 114 stands by until the operator presses the printing position adjustment button 902 (N in Step S1202). In a case where the printing position adjustment button 902 is pressed (Y in Step S1202), the CPU 114 displays the printing position adjustment screen 1000 of FIG. 10A on the operation panel 120 (Step S1203). The CPU 114 stands by until any one of the initial adjustment button 1001, the print adjustment button 1002, and the back button 1003 is pressed (N in Step S1204).

In a case where a button other than the initial adjustment button 1001 is pressed (N in Step S1205), the CPU 114 determines whether or not the pressed button is the print adjustment button 1002 (Step S1207). In a case where the back button 1003 has been pressed (N in Step S1207), the CPU 114 returns the process to the processing step of Step S1203, and displays the printing position adjustment screen 1000 on the operation panel 120. In a case where the print adjustment button 1002 has been pressed (Y in Step S1207), the CPU 114 performs print adjustment setting processing described later (Step S1209). In a case where the print adjustment setting processing is ended, the CPU 114 returns the process to the processing step of Step S1203, or ends the processing.

In a case where the initial adjustment button 1001 has been pressed (Y in Step S1205), the CPU 114 displays the initial adjustment screen 1010 of FIG. 10B on the operation panel 120 (Step S1206). The operator selects, through the initial adjustment screen 1010, a sheet feeding stage in which paper sheets to be subjected to the initial front-and-back position correction are received. The CPU 114 stands by until the execute button 1012 or the cancel button 1013 on the initial adjustment screen 1010 is pressed (N in Step S1208).

In a case where the cancel button 1013 is pressed (N in Step S1210), the CPU 114 returns the process to the processing step of Step S1203, and displays the printing position adjustment screen 1000 on the operation panel 120. In a case where the execute button 1012 is pressed (Y in Step S1210), the CPU 114 controls the printer 150 to print the images for adjustment on the paper sheets received in the sheet feeding stage selected by the operator. To that end, the CPU 114 reads out the image data on each image for adjustment from the storage 115 (Step S1211), and causes the printer 150 to print the images for adjustment based on the image data (Step S1212).

For example, in a case where the operator selects "DEF PAPER, EMBOSSED PAPER A-1" of the sheet feeding stage 3, the CPU 114 reads out the image data on the image 70*a* for adjustment from the storage 115 (Step S1211). The CPU 114 causes the printer 150 to print the image 70*a* for adjustment on a paper sheet fed from the sheet feeding stage 140*c* based on the read-out image data (Step S1212). The printer 150 prints the image 70*a* for adjustment on the front surface of the paper sheet, and then conveys the paper sheet toward the reverser 136. The printer 150 reverses the paper sheet in the reverser 136, and then conveys the paper sheet to the conveyance path 138, and again prints the image 70*a* for adjustment on the back surface of the paper sheet. The image 70*a* for adjustment is printed on both the surfaces to create a sheet for adjustment. After that, the printer 150 conveys the created sheet for adjustment to the reading apparatus 160.

The CPU 114 controls the reading apparatus 160 to read the image 70*a* for adjustment printed on both the surfaces of the sheet for adjustment (Step S1213). The CPU 114 reads the image 70*a* for adjustment on both the surfaces by the line sensors 312*a* and 312*b* while conveying the sheet for adjustment to the conveyance path 313 of the reading apparatus 160. The sheet for adjustment delivered from the reading apparatus 160 is delivered to the delivery tray of the finisher 190.

The CPU 114 acquires the reading results of the sheet for adjustment from the reading apparatus 160, and calculates printing position deviation amounts from the reading results based on the calculation methods of FIG. 8 (Step S1214). The CPU 114 saves the calculated printing position deviation amounts in the paper sheet library 600 in association with the paper sheet of the sheet feeding stage selected by the operator (Step S1215). The initial front-and-back position correction based on one image for adjustment is ended by the processing steps of from Step S1211 to Step S1215.

The CPU 114 determines whether or not the initial front-and-back position correction has been ended for all the images 70*a* to 70*e* for adjustment (Step S1216). In a case where the initial front-and-back position correction has not been ended (N in Step S1216), the CPU 114 returns the process to the processing step of Step S1211, and reads out the image data on the next image for adjustment (in this case, the image 70*b* for adjustment) from the storage 115 to perform the initial front-and-back position correction.

In a case where the initial front-and-back position correction has been ended for all the images for adjustment (Y in Step S1216), the CPU 114 ends the processing for the initial front-and-back position correction. Through the initial front-and-back position correction, the printing position deviation amounts of the respective toner adhesion amount classes of "DEF PAPER, EMBOSSED PAPER A-1" 603 are saved in the paper sheet library 600 of FIG. 7A and FIG. 7B. Specifically, the printing position deviation amounts calculated by reading the image 70*a* for adjustment are saved in the printing position deviation amount (front surface) 618 and the printing position deviation amount (back surface) 619. The printing position deviation amounts calculated by reading the image 70*b* for adjustment are saved in the printing position deviation amount (front surface) 620 and the printing position deviation amount (back surface) 621. The printing position deviation amounts calculated by reading the image 70*c* for adjustment are saved in the printing position deviation amount (front surface) 622 and the printing position deviation amount (back surface) 623. The printing position deviation amounts calculated by reading the image 70*d* for adjustment are saved in the printing position deviation amount (front surface) 624 and the printing position deviation amount (back surface) 625. The printing position deviation amounts calculated by reading the image 70*e* for adjustment are saved in the printing position deviation amount (front surface) 626 and the printing position deviation amount (back surface) 627.

<Image Forming Processing>

Figure 12:
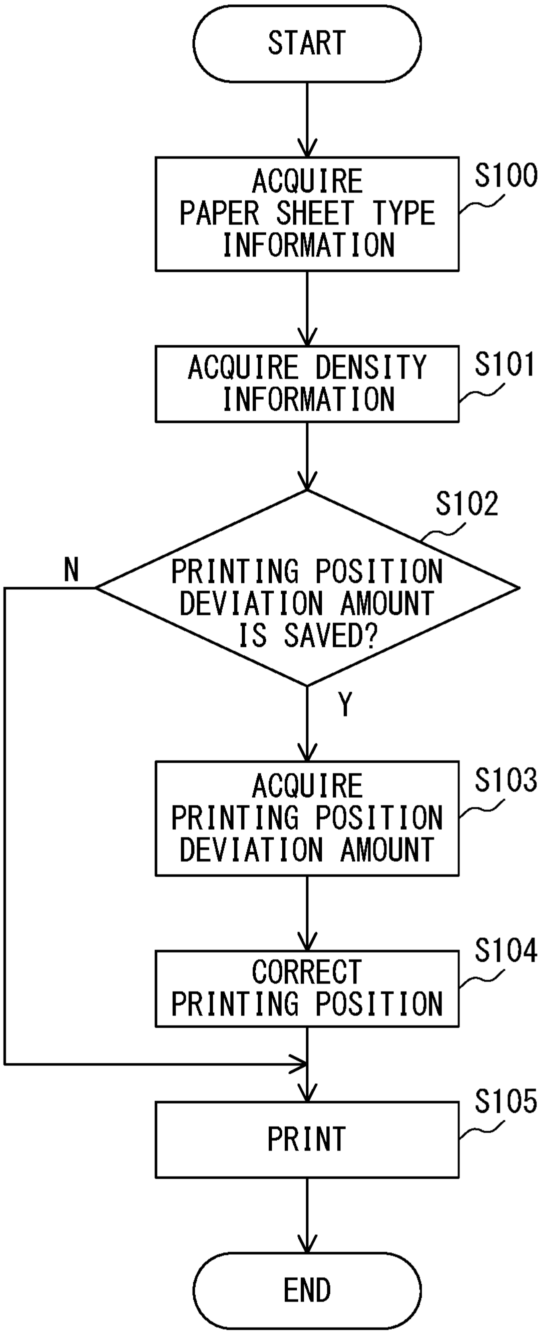
FIG. 12 is a flow chart for illustrating image forming processing.

FIG. 12 is a flow chart for illustrating image forming processing performed by the image forming apparatus 100. Each step of this flow chart is implemented by the CPU 114 reading out and executing the program stored in the ROM 112.

In a case where a print job is input from the host computer 101 or the operation panel 120, the CPU 114 acquires information on the type of sheet included in the print job (Step S100). The CPU 114 acquires density information on the output image, the density information being obtained from the image data in units of pages of the print job (Step S101). Specifically, the CPU 114 acquires, as the density information, an image signal value T from the image data in units of pages of the print job. The image signal value T is a value for designating an image density. The CPU 114 uses the image signal value T of the image data to determine the density information on a density of the image included in the print job.

The CPU 114 uses the pieces of information acquired in the processing steps of Step S100 and Step S101 to determine whether or not the printing position deviation amount of the paper sheet designated by the print job is saved (Step S102). For example, the CPU 114 refers to the paper sheet library 600 to determine whether or not the printing position deviation amount of the paper sheet designated by the print job has a value other than the initial value of 0.

In a case where the printing position deviation amount is saved (the printing position deviation amount of the paper sheet has a value other than the initial value of 0) (Y in Step S102), the CPU 114 acquires the printing position deviation amount of the designated paper sheet (Step S103). The CPU 114 corrects the printing position by processing the image data included in the print job based on the acquired printing position deviation amount (Step S104). For example, the CPU 114 loads the image data included in the print job into a bitmap image, and performs affine transformation on the bitmap image based on the acquired printing position deviation amount, to thereby correct the printing position. The CPU 114 controls the printer 150 to feed the designated paper sheet from the sheet feeding apparatus 140 and print the image on the paper sheet based on the image data for which the printing position has been corrected (Step S105).

In a case where the printing position deviation amount is not saved (the printing position deviation amount of the paper sheet has a value equal to the initial value of 0) (N in Step S102), the CPU 114 does not correct the printing position. In this case, the CPU 114 controls the printer 150 to feed the designated paper sheet from the sheet feeding apparatus 140 and print the image on the paper sheet based on the image data included in the print job (Step S105).

After the above-mentioned steps, the image forming processing is ended. Through execution of the image forming processing in units of pages to be printed, it is possible to correct the printing position based on the printing position deviation amount corresponding to the toner adhesion amount for each page to be printed. This enables highly accurate correction of the printing position for each page.

<Execution Interval Setting for Print Front-and-Back Position Correction>

Figure 13:
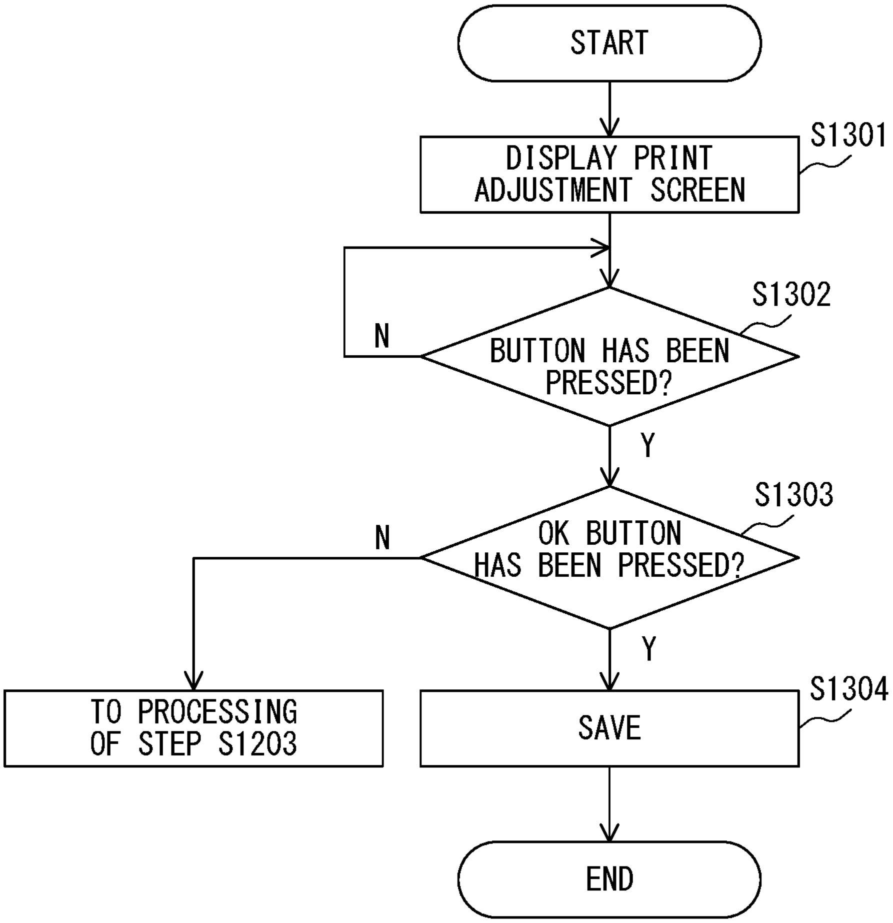
FIG. 13 is a flow chart for illustrating execution interval setting processing for print front-and-back position correction.

FIG. 13 is a flow chart for illustrating execution interval setting processing for the print front-and-back position correction. Control in each step of this flow chart is implemented by the CPU 114 reading out and executing the program stored in the ROM 112. This processing is processing that is performed as the print adjustment setting processing in Step S1209 of FIG. 11.

In a case where the print adjustment button 1002 is pressed in the processing step of Step S1207 of FIG. 11, the CPU 114 displays the print adjustment screen 1020 of FIG. 10C on the operation panel 120 (Step S1301). The CPU 114 stands by until the OK button 1023 or the cancel button 1024 on the print adjustment screen 1020 is pressed (N in Step S1302). In a case where the button is pressed (Y in Step S1302), the CPU 114 determines which of the OK button 1023 and the cancel button 1024 has been pressed (Step S1303). In a case where the cancel button 1024 has been pressed (N in Step S1303), the CPU 114 ends the execution interval setting processing for the print front-and-back position correction, and returns the process to the processing step of Step S1203 of FIG. 11.

In a case where the OK button 1023 has been pressed (Y in Step S1303), the CPU 114 saves input results (input values of the print adjustment enabling checkbox 1021 and the number-of-sheets setting box 1022) obtained through the print adjustment screen 1020 (Step S1304). For example, in a case where the print adjustment enabling checkbox 1021 has been checked, the CPU 114 sets a print front-and-back position correction execution flag F saved in the RAM 113 to "1". In a case where the print adjustment enabling checkbox 1021 has not been checked, the CPU 114 sets the print front-and-back position correction execution flag F to "0". In addition, the CPU 114 saves a numerical value of the number of sheets input in the number-of-sheets setting box 1022 to the RAM 113 as the number N of sheets every which the print front-and-back position correction is to be executed. Each time the printing of the saved number N of sheets every which the print front-and-back position correction is to be executed is performed, the front-and-back position correction is performed. After the input results have been saved, the CPU 114 ends the execution interval setting processing for the print front-and-back position correction.

Figure 14A:
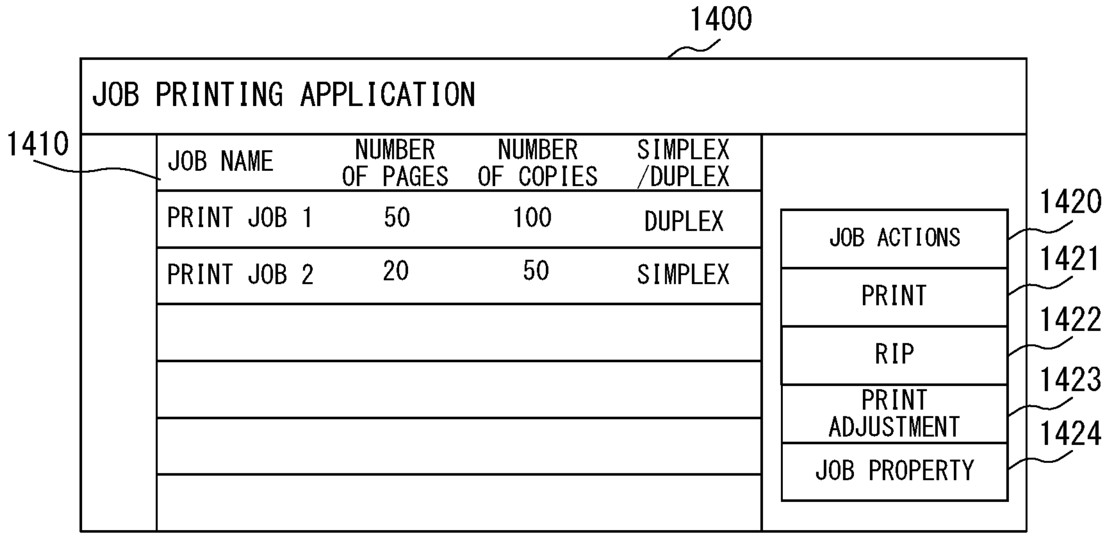
FIG. 14A and FIG. 14B are explanatory views of paper sheet selection screens.
Figure 14B:
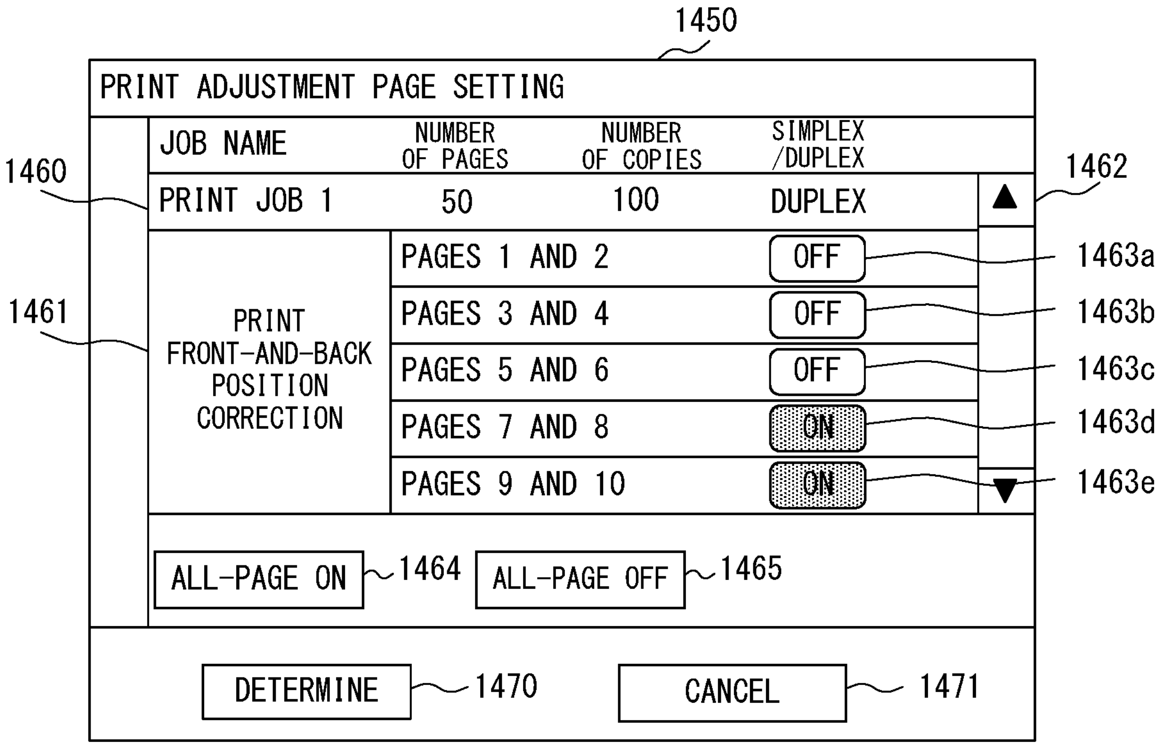

FIG. 14A and FIG. 14B are explanatory views of paper sheet selection screens that allow the operator to execute the print front-and-back position correction. FIG. 14A and FIG. 14B are application screens displayed on the operation panel 120.

On a job printing application screen 1400 exemplified in FIG. 14A, a print job list 1410 and job actions 1420 are displayed. In the print job list 1410, print jobs input from the host computer 101 are displayed in a list format. In the print job list 1410, a job name, the number of sheets (number of pages) to be printed, the number of copies to be printed, and which of simplex printing and duplex printing is to be performed are displayed for each print job. Under the job actions 1420, actions to be executed for each print job displayed in the print job list 1410 are displayed. The job actions 1420 include a print button 1421, a RIP button 1422, a print adjustment button 1423, and a job property button 1424.

The print button 1421 is a button for causing the image forming apparatus 100 to print a print job selected by the operator from the print job list 1410. The RIP button 1422 is a button for causing the image forming apparatus 100 to render the print job selected by the operator from the print job list 1410. The print adjustment button 1423 is a button for setting the print front-and-back position correction of the paper sheet designated by the print job selected by the operator from the print job list 1410. In a case where the print adjustment button 1423 is pressed, a print adjustment page setting screen 1450 exemplified in FIG. 14B is displayed on the operation panel 120. The job property button

1424 is a button for displaying the print settings of the print job selected by the operator from the print job list 1410. In a case where the job property button 1424 is pressed, the operation panel 120 displays a job setting list (not shown). The job setting list includes the number of copies to be printed and information indicating which of the simplex printing and the duplex printing is to be performed.

In a case where no print job has been selected from the print job list 1410, the display on the operation panel 120 is not switched whichever one of the print button 1421, the RIP button 1422, the print adjustment button 1423, and the job property button 1424 is pressed.

The print adjustment page setting screen 1450 exemplified in FIG. 14B includes a job display section 1460 being a screen for displaying the settings (such as the number of pages (the number of sheets), the number of copies, and which of the simplex printing and the duplex printing is to be performed) of the selected print job. The print adjustment page setting screen 1450 also includes a print front-and-back position correction page list 1461 being a page list of the selected print job in which items are displayed in unit of pairs of front and back pages. In a case where items of the page list displayed in the print front-and-back position correction page list 1461 are not displayed at a time, a scroll bar 1462 is displayed. The operator can view all the items of the page list by operating the scroll bar 1462.

In addition, the print adjustment page setting screen 1450 includes a print front-and-back position correction selection buttons 1463 (1463*a* to 1463*e*), an all-page selection button 1464, an all-page deselection button 1465, a determine button 1470, and a cancel button 1471.

The print front-and-back position correction selection buttons 1463 (1463*a* to 1463*e*) are buttons for setting whether or not to perform the print front-and-back position correction in units of pages displayed in the print front-and-back position correction page list 1461. The print front-and-back position correction selection buttons 1463 are each displayed in a so-called toggle manner. For that reason, each print front-and-back position correction selection button 1463 is switched to be displayed as "ON" by being pressed while being displayed as "OFF", and is switched to be displayed as "OFF" by being pressed while being displayed as "ON". Only five print front-and-back position correction selection buttons 1463 are displayed in FIG. 14B, but there are as many print front-and-back position correction selection buttons 1463 as the number of pages (the number of sheets) corresponding to the selected print job. In a case where the scroll bar 1462 is scrolled, buttons (not shown) including a print front-and-back position correction selection button 1463*f* and the subsequent print front-and-back position correction selection buttons are displayed together with items of the page list.

The all-page selection button 1464 is a button for collectively setting the print front-and-back position correction to be performed for all the pages of the selected print job. In a case where the all-page selection button 1464 is pressed, the print front-and-back position correction selection buttons 1463 for all the pages are switched to be displayed as "ON". The all-page deselection button 1465 is a button for collectively setting the print front-and-back position correction not to be performed all the pages of the selected print job. In a case where the all-page deselection button 1465 is pressed, the print front-and-back position correction selection buttons 1463 for all the pages are switched to be displayed as "OFF".

The print front-and-back position correction selection buttons 1463, the all-page selection button 1464, and the all-page deselection button 1465 can be pressed only at a time of a print job for duplex printing. For that reason, at a time of a print job for simplex printing, the display of the operation panel 120 is not switched whichever one of the print front-and-back position correction selection buttons 1463, the all-page selection button 1464, and the all-page deselection button 1465 is pressed.

In a case where the determine button 1470 is pressed, print adjustment page settings are saved to the RAM 113, and the display of the operation panel 120 returns to the job printing application screen 1400. In a case where the cancel button 1471 is pressed, print adjustment page settings are not saved, and the display of the operation panel 120 returns to the job printing application screen 1400.

FIG. 15A to FIG. 15C are an explanatory view and explanatory tables of a method of storing the print adjustment page settings set for each print job through the print adjustment page setting screen 1450. In this case, settings of a print job 1 of FIG. 14B are described as an example. FIG. 15A is an illustration of output images of the print job 1. FIG. 15B is a class table for determining the toner adhesion amount class from the image signal value T of the output image. FIG. 15C shows a table of print front-and-back position correction execution information for each print job.

As illustrated in FIG. 15A, the print job 1 is a job for duplex printing, and the odd-numbered pages are front surface images, and the even-numbered pages are back surface images. The print job 1 is a job for 50 pages, but description is given of the first 10 pages for the sake of convenience. However, it goes without saying that the same applies to the subsequent pages.

An output image 1500*a* is an output image on a first page of the print job 1. There are margins in top, bottom, right, and left end portions. An output image 1500*b* is an output image on a second page of the print job 1. An output image 1501*a* is an output image on a third page, and an output image 1501*b* is an output image on a fourth page. An output image 1502*a* is an output image on a fifth page, and an output image 1502*b* is an output image on a sixth page. Text is displayed in each of the output images 1501*a*, 1501*b*, 1502*a*, and 1502*b*. An output image 1503*a* is an output image on a seventh page, and an output image 1503*b* is an output image on an eighth page. An output image 1504*a* is an output image on a ninth page, and an output image 1504*b* is an output image on a tenth page. An image such as a photograph is displayed in each of the output images 1503*a*, 1503*b*, 1504*a*, and 1504*b*.

A method of determining the toner adhesion amount class from the toner adhesion amount of each output image through use of a toner adhesion amount class table 1520 of FIG. 15B is described. The toner adhesion amount class table 1520 is stored in advance in the ROM 112. The CPU 114 determines the toner adhesion amount class of the page by comparing the image signal value T in units of pages of the print job acquired in the processing step of Step S101 of FIG. 12 to threshold values determined in advance in the toner adhesion amount class table 1520. For example, in a case where the image signal value of each page of the print job 1 is 50%, the toner adhesion amount class of each page is determined to be "3". The toner adhesion amount class table 1520 is stored in the ROM 112, but may be stored in another nonvolatile memory such as the storage 115 or an EEPROM.

The table of the print front-and-back position correction execution information of FIG. 15C is stored in the RAM 113, and is a setting table that stores the print front-and-back position correction execution information for each print job.

A print front-and-back position correction setting table 1550 is a table including a page number 1560, a print front-and-back position correction execution page flag Fp 1561, and image data on images 1562 for adjustment (front surface 1562*a* and back surface 1562*b*). The print front-and-back position correction setting table 1550 is stored in the RAM 113 for each print job. The print front-and-back position correction setting table 1550 may be independently stored in the RAM 113, or may be stored as one of job properties (not shown).

The print job 1 of FIG. 14B has the print front-and-back position correction selection buttons 1463 displayed as "OFF" for "PAGES 1 AND 2," "PAGES 3 AND 4," and "PAGES 5 AND 6," that is, is set so that those pages are not to be subjected to the print front-and-back position correction. Therefore, "O" is set in the print front-and-back position correction execution page flag Fp. The print job 1 has the print front-and-back position correction selection buttons 1463 displayed as "ON" for "PAGES 7 AND 8" and "PAGES 9 AND 10," that is, is set so that those pages are to be subjected to the print front-and-back position correction. Therefore, "1" is set in the print front-and-back position correction execution page flag Fp.

Attention is given to a page for which the print front-and-back position correction execution page flag Fp is set to "1". In a case where the image signal value T of the output image 1503*a* on the seventh page of FIG. 15A is 30%, the toner adhesion amount class becomes "TONER ADHESION AMOUNT CLASS 2" from the toner adhesion amount class table 1520. Therefore, the image for adjustment of "TONER ADHESION AMOUNT CLASS 2" is stored in the image 1562*a* for adjustment (front surface). At this time, a method of storing the image for adjustment involves storing the image data or storing reference information (so-called address information or pointer) on the image data of the image for adjustment of FIG. 4. In the same manner, in a case where the image signal value T of the output image 1503*b* on the eighth page of FIG. 15A is 90%, the image for adjustment of "TONER ADHESION AMOUNT CLASS 5" is stored in the image 1562*b* for adjustment (back surface). In a case where the image signal value T of the output image 1504*a* on the ninth page is 85%, the image for adjustment of "TONER ADHESION AMOUNT CLASS 4" is stored in the image 1562*a* for adjustment (front surface). In a case where the image signal value T of the output image 1504*b* on the tenth page is 55%, the image for adjustment of "TONER ADHESION AMOUNT CLASS 3" is stored in the image 1562*b* for adjustment (back surface).

The table of the print front-and-back position correction execution information may be stored in the storage 115. The table of the print front-and-back position correction execution information may be stored in both the RAM 113 and the storage 115 or in another memory such as an EEPROM. The threshold values of the toner adhesion amount class table 1520 are not limited to the example described herein, and may be changed as appropriate.

Figure 16:
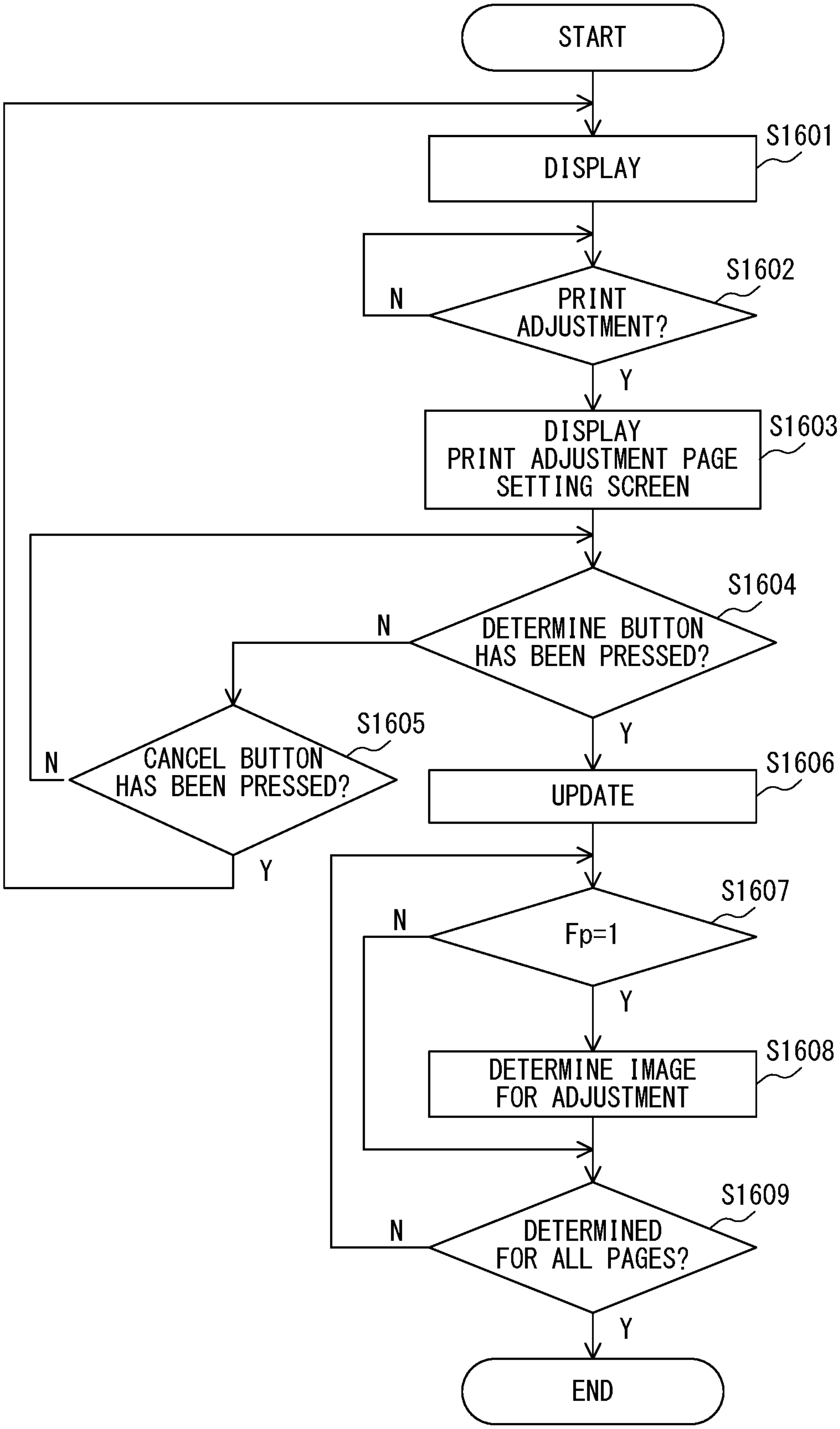
FIG. 16 is a flow chart for illustrating processing for setting pages on which the print front-and-back position correction is to be executed.

FIG. 16 is a flow chart for illustrating processing for setting pages on which the print front-and-back position correction is to be executed, which is executed by the CPU 114 of the image forming apparatus 100. Control in each step of this flow chart is implemented by the CPU 114 reading out and executing the program stored in the ROM 112. This processing is performed prior to the start of the print job.

In a case where the operator uses the operation panel 120 to make a request to display the job printing application screen 1400 of FIG. 14A, the CPU 114 displays the job printing application screen 1400 on the operation panel 120 (Step S1601). The CPU 114 stands by until the operator selects a print job and presses the print adjustment button 1423 (N in Step S1602). Description of a case in which each of the other buttons (print button 1421, RIP button 1422, and job property button 1424) included in the job actions 1420 is pressed is omitted below. The print job selected by the operator is a job for instructing to print images of a plurality of pages.

In a case where the print adjustment button 1423 is pressed (Y in Step S1602), the CPU 114 displays the print adjustment page setting screen 1450 of FIG. 14B on the operation panel 120 (Step S1603). The CPU 114 stands by until the print front-and-back position correction selection button 1463 is appropriately set and the determine button 1470 or the cancel button 1471 on the print adjustment page setting screen 1450 is pressed (N in Step S1604 and N in Step S1605). In a case where the cancel button 1471 is pressed (N in Step S1604 and Y in Step S1605), the CPU 114 does not update a value of the print front-and-back position correction execution page flag Fp of FIG. 15C, and returns the process to the processing step of Step S1601 to display the job printing application screen 1400.

In a case where the determine button 1470 is pressed (Y in Step S1604), the CPU 114 updates the values of the print front-and-back position correction execution page flags Fp of the respective pages in accordance with the settings of the print front-and-back position correction selection buttons 1463, and stores the updated values in the RAM 113 (Step S1606). That is, a page for which the print front-and-back position correction selection button 1463 is displayed as "OFF" has the print front-and-back position correction execution page flag Fp set to "0". A page for which the print front-and-back position correction selection button 1463 is displayed as "ON" has the print front-and-back position correction execution page flag Fp set to "1". A page for which the print front-and-back position correction selection button 1463 is displayed as "ON" indicates an image selected from a plurality of images included in the print job. The CPU 114 acquires information indicating that the print front-and-back position correction execution page flag Fp is "1" as user selection information indicating a selection result of the image selected from the plurality of images included in the print job.

The CPU 114 determines whether or not the value of the print front-and-back position correction execution page flag Fp for each updated page is "1" (Step S1607). In a case where the value of the print front-and-back position correction execution page flag Fp is "1" (Y in Step S1607), the CPU 114 refers to the toner adhesion amount class table 1520 in the ROM 112 to determine the image for adjustment for the page (Step S1608).

In a case where the value of the print front-and-back position correction execution page flag Fp is "0" (N in Step S1607), or in a case where the image for adjustment is determined, the CPU 114 determines whether or not the images for adjustment have been determined for all the pages of the selected print job (Step S1609). In a case where there is a page for which the image for adjustment has not been determined (N in Step S1606), the CPU 114 refers to the print front-and-back position correction execution page flag Fp for the subsequent page of the print front-and-back position correction setting table 1550 of FIG. 15C, and returns the process to the processing step of Step S1607. In a case where the images for adjustment have been determined for all the pages (Y in Step S1609), the CPU 114 ends the processing for setting pages on which the print front-and-back position correction is to be executed. Thus, the CPU 114 determines images for adjustment to be formed.

<Print Front-and-Back Position Correction>

Figure 17:
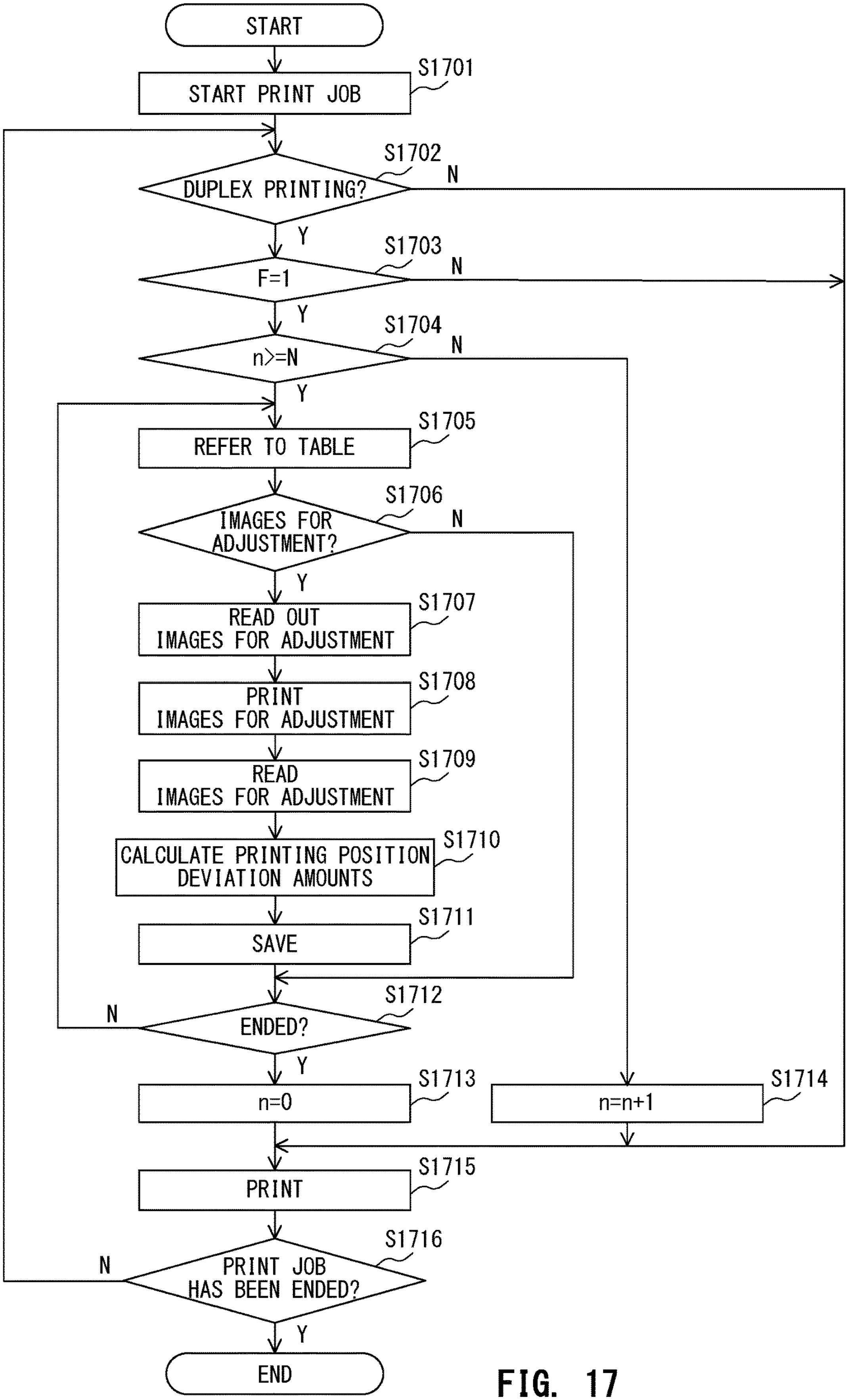
FIG. 17 is a flow chart for illustrating the print front-and-back position correction processing.

FIG. 17 is a flow chart for illustrating print front-and-back position correction processing executed by the CPU 114 of the image forming apparatus 100. Control in each step of this flow chart is implemented by the CPU 114 reading out and executing the program stored in the ROM 112.

In a case where the operator presses the print button 1421 under the job actions 1420 on the job printing application screen 1400 of FIG. 14A, the CPU 114 starts the print job (Step S1701). The CPU 114 determines whether or not the print job to be executed is a job for duplex printing (Step S1702). In a case of the duplex printing (Y in Step S1702), the CPU 114 determines whether or not the print front-and-back position correction execution flag F in the RAM 113 is "1" (Step S1703).

As described above, the print front-and-back position correction execution flag F is set by the print adjustment enabling checkbox 1021 on the print adjustment screen 1020 of FIG. 10C. In a case where the print front-and-back position correction execution flag F is "1" (Y in Step S1703), the print front-and-back position correction is performed. In this case, the CPU 114 determines whether or not a counter "n" for the number of sheets on which the print front-and-back position correction has been executed is equal to or larger than the number N of sheets every which the print front-and-back position correction is to be executed, the counter "n" being stored in the RAM 113 (Step S1704). As described above, the number N of sheets every which the print front-and-back position correction is to be executed has a value set by the number-of-sheets setting box 1022 on the print adjustment screen 1020 of FIG. 10C.

In a case where the counter "n" for the number of sheets on which the print front-and-back position correction has been executed is smaller than the number N of sheets every which the print front-and-back position correction is to be executed (N in Step S1704), the CPU 114 adds 1 to, or increments by 1, the counter "n" for the number of sheets on which the print front-and-back position correction has been executed, and stores a resultant thereof in the RAM 113 (Step S1714). In a case where the counter "n" for the number of sheets on which the print front-and-back position correction has been executed is equal to or larger than the number N of sheets every which the print front-and-back position correction is to be executed (Y in Step S1704), the CPU 114 refers to the page numbers 1560 of the print front-and-back position correction setting table 1550 of FIG. 15C in ascending order from the smallest number (Step S1705). The CPU 114 determines whether or not the images 1562 for adjustment are registered in the page numbers that have been referred to (Step S1706).

In a case where the images 1562 for adjustment are registered (Y in Step S1706), the CPU 114 reads out the image data on the images 1562 for adjustment for the pages (Step S1707). The image data on the images 1562 for adjustment to be read out in this case has been determined in the processing of FIG. 16. The CPU 114 prints, by duplex printing, the front surface image (image 1562*a* for adjustment) and the back surface image (image 1562*b* for adjustment) of the read-out images 1562 for adjustment on the pages (Step S1708). That is, the CPU 114 controls the printer 150 to feed a paper sheet having the same type as those of the pages from one of the sheet feeding stages 140*a*, 140*b*, 140*c*, 140*d*, and 140*e* to generate a sheet for adjustment.

For example, in a case where the type of paper sheet of the pages is "DEF PAPER, EMBOSSED PAPER A-1," the printer 150 prints the read-out image 1562*a* for adjustment on the first surface (front surface) of the paper sheet fed from the sheet feeding stage 140*c*. Subsequently, the printer 150 reverses the paper sheet by the reverser 136, and then prints the image 1562*b* for adjustment on the second surface (back surface) of the paper sheet. The printer 150 conveys the sheet for adjustment generated in this manner to the reading apparatus 160.

The CPU 114 controls the reading apparatus 160 to read the image 1562*a* for adjustment and the image 1562*b* for adjustment of the sheet for adjustment (Step S1709). The CPU 114 reads the images for adjustment by the line sensors 312*a* and 312*b* while conveying the sheet for adjustment by the reading apparatus 160. The sheet for adjustment delivered from the reading apparatus 160 is delivered to the delivery tray of the finisher 190.

The CPU 114 acquires the reading results of the sheet for adjustment from the reading apparatus 160, and calculates printing position deviation amounts from the reading results based on the calculation methods shown in FIG. 8 (Step S1710). The CPU 114 saves the calculated printing position deviation amounts in the paper sheet library 600 in association with the paper sheet of the sheet feeding stage for the page (Step S1711).

For example, in a case where "DEF PAPER, EMBOSSED PAPER A-1" is used as the paper sheet for the pages, the calculated printing position deviation amounts are saved as the printing position deviation amounts of "DEF PAPER, EMBOSSED PAPER A-1" 603 in the paper sheet library 600. Specifically, in a case where the image 1562*a* for adjustment for the page has "TONER ADHESION AMOUNT CLASS 2," the CPU 114 saves the calculated printing position deviation amounts in the printing position deviation amount (front surface) 620. In a case where the image 1562*b* for adjustment for the page has "TONER ADHESION AMOUNT CLASS 5," the CPU 114 saves the calculated printing position deviation amounts in the printing position deviation amount (back surface) 627.

The CPU 114 determines whether or not the print front-and-back position correction has been ended for all the images for adjustment stored in the print front-and-back position correction setting table 1550 (Step S1712). In a case where the print front-and-back position correction has not been ended (N in Step S1712), the CPU 114 returns the process to the processing step of Step S1705, and reads out the subsequent image for adjustment from the print front-and-back position correction setting table 1550 to perform print front-and-back position correction thereon.

In a case where the print front-and-back position correction has been ended for all the images for adjustment (Y in Step S1712), the CPU 114 ends the print front-and-back position correction, and stores "O" as the value of the counter "n" for the number of sheets on which the print front-and-back position correction has been executed (Step S1713). After that, the CPU 114 causes the printer 150 to print an output image corresponding to the print job (Step S1715). In this case, the printing position is corrected based on the printing position deviation amounts acquired through the print front-and-back position correction. In a case where the printing of the image corresponding to one page has been finished, the CPU 114 determines whether or not the print job has been ended (Step S1716). In a case where the print job has not been ended (N in Step S1716), the CPU 114 returns the process to the processing step of Step S1702, and repeatedly performs Step S1702 and the subsequent processing steps. In a case where the print job has been ended (Y in Step S1716), the CPU 114 ends the processing.

In a case of the simplex printing (N in Step S1702), the CPU 114 causes the printer 150 to print an output image corresponding to the print job (Step S1715). In this case, the correction of the printing position based on the printing position deviation amounts acquired through the print front-and-back position correction is not performed. In a case where the printing of the image corresponding to one page has been finished, the CPU 114 determines whether or not the print job has been ended (Step S1716). In a case where the print job has not been ended (N in Step S1716), the CPU 114 returns the process to the processing step of Step S1702, and repeatedly performs Step S1702 and the subsequent processing steps. In a case where the print job has been ended (Y in Step S1716), the CPU 114 ends the processing.

In the same manner, in a case where the print front-and-back position correction execution flag F is "0" (N in Step S1703), the CPU 114 causes the printer 150 to print an output image corresponding to the print job (Step S1715). In this case, the correction of the printing position based on the printing position deviation amounts acquired through the print front-and-back position correction is not performed. In a case where the printing of the image corresponding to one page has been finished, the CPU 114 determines whether or not the print job has been ended (Step S1716). In a case where the print job has not been ended (N in Step S1716), the CPU 114 returns the process to the processing step of Step S1702, and repeatedly performs Step S1702 and the subsequent processing steps. In a case where the print job has been ended (Y in Step S1716), the CPU 114 ends the processing.

Further, after 1 is added in the processing step of Step S1714 to the counter "n" for the number of sheets on which the print front-and-back position correction has been executed, the CPU 114 causes the printer 150 to print an output image corresponding to the print job (Step S1715). In this case, the printing position is corrected based on the printing position deviation amounts acquired through the initial front-and-back position correction or the print front-and-back position correction. In a case where the printing of the image corresponding to one page has been finished, the CPU 114 determines whether or not the print job has been ended (Step S1716). In a case where the print job has not been ended (N in Step S1716), the CPU 114 returns the process to the processing step of Step S1702, and repeatedly performs Step S1702 and the subsequent processing steps. In a case where the print job has been ended (Y in Step S1716), the CPU 114 ends the processing.

Modification Example

The output image designated by a print job can also be used as the image for adjustment to perform the print front-and-back position correction.

Figure 18:
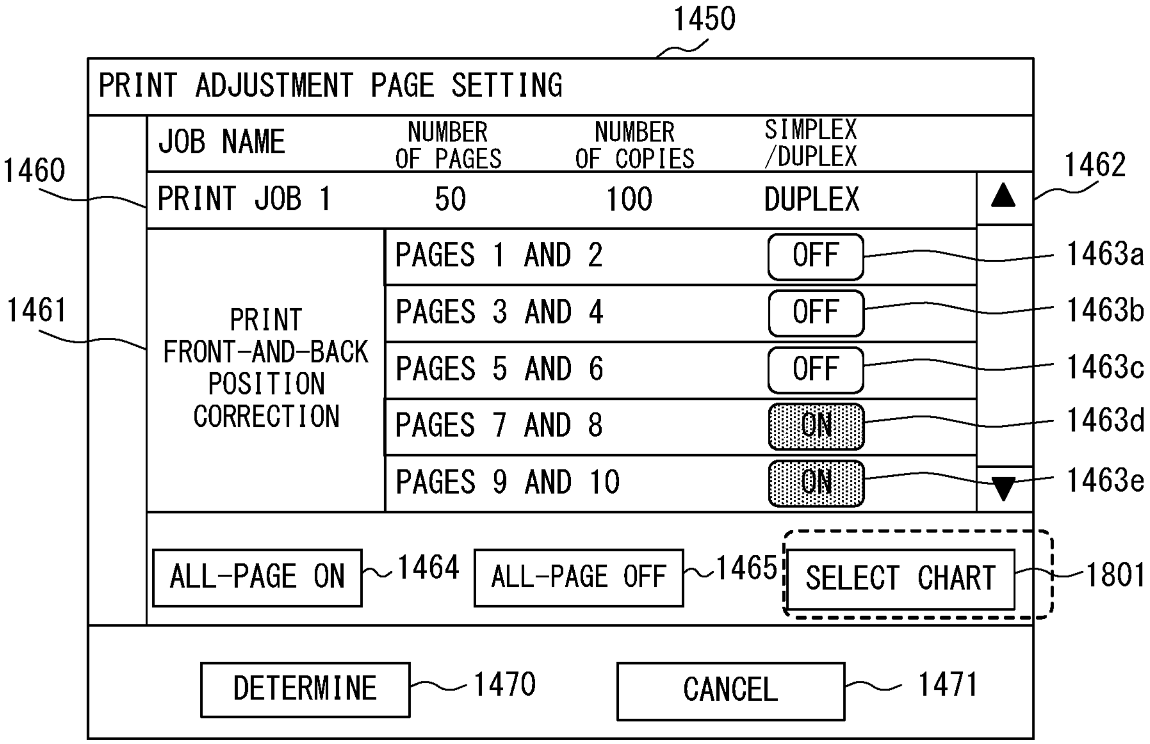
FIG. 18 is an exemplary view of a print adjustment page setting screen.

FIG. 18 is an exemplary view of the print adjustment page setting screen 1450. This print adjustment page setting screen 1450 is obtained by adding a select chart button 1801, which is indicated by being surrounded by the dotted line, to the screen of FIG. 14B. The same screen components as those of the screen of FIG. 14B are denoted by the same reference symbols. In the job display section 1460, the print job selected through the print job list 1410 of FIG. 14A by the operator from among the print jobs input from the host computer 101 is displayed.

Figure 19A:
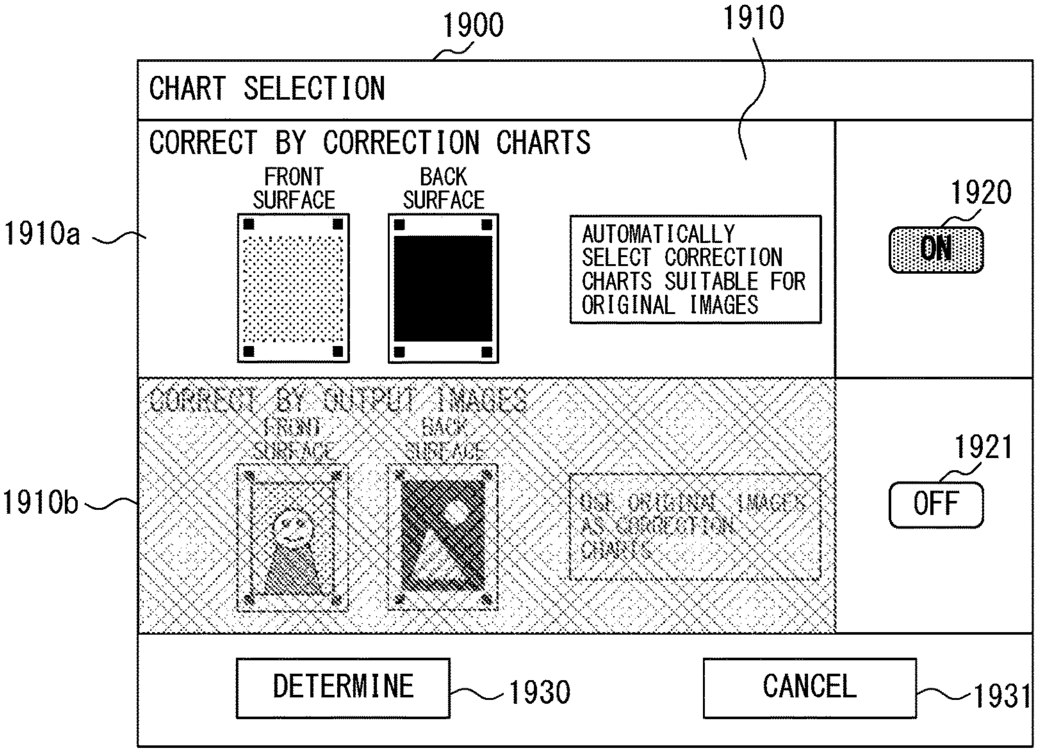
FIG. 19A and FIG. 19B are exemplary views of a chart selection screen.
Figure 19B:
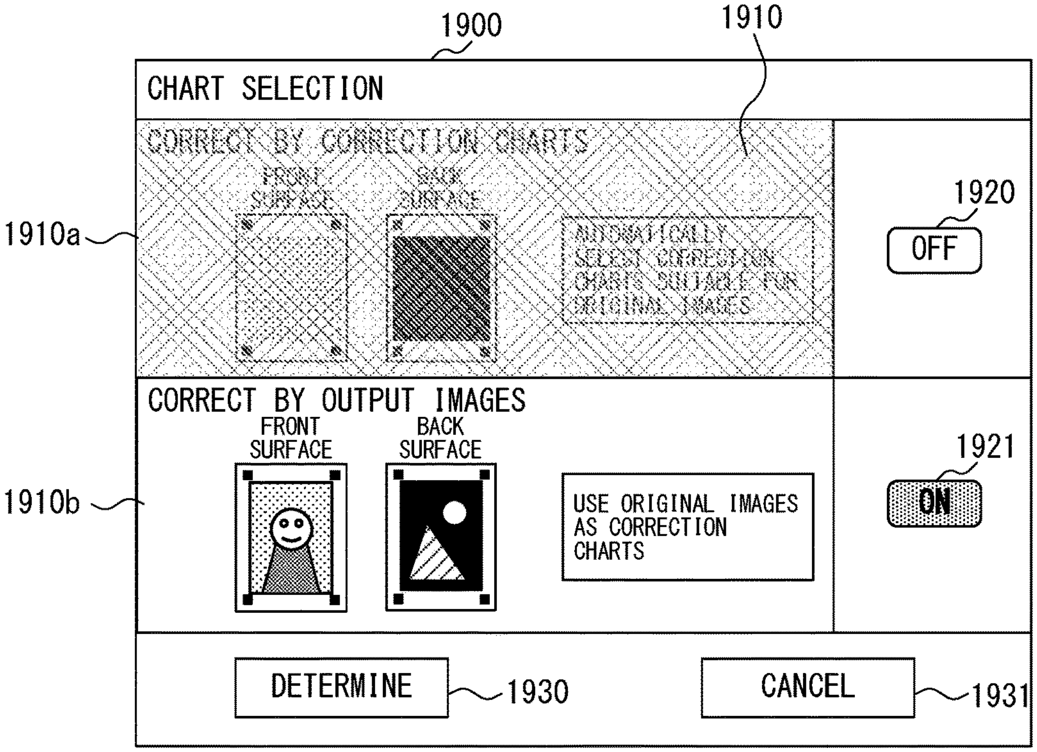

FIG. 19A and FIG. 19B are exemplary views of a chart selection screen displayed on the operation panel 120. A chart selection screen 1900 is displayed on the operation panel 120 in a case where the select chart button 1801 is pressed with the pages being selected in the print front-and-back position correction page list 1461 on the print adjustment page setting screen 1450. The chart selection screen 1900 includes a selected-chart display section 1910, a correction chart selection button 1920, an output image chart selection button 1921, a determine button 1930, and a cancel button 1931.

The selected-chart display section 1910 includes a correction chart display section 1910*a* and an output image chart display section 1910*b*. In the correction chart display section 1910*a*, the images for adjustment determined in the processing of FIG. 16 are displayed. In the output image chart display section 1910*b*, images obtained by adding the marks 720 for correction of FIG. 3 to the output images of the pages selected in the print front-and-back position correction page list 1461 are displayed.

The correction chart selection button 1920 and the output image chart selection button 1921 are each displayed in a so-called toggle manner. For that reason, each of the correction chart selection button 1920 and the output image chart selection button 1921 is switched to be displayed as "ON" by being pressed while being displayed as "OFF", and is switched to be displayed as "OFF" by being pressed while being displayed as "ON".

In addition, the correction chart display section 1910*a* and the output image chart display section 1910*b* are displayed exclusively of each other, and the correction chart selection button 1920 and the output image chart selection button 1921 are displayed exclusively of each other. Specifically, as illustrated in FIG. 19A, in a case where the correction chart selection button 1920 is displayed as "ON", the output image chart selection button 1921 is displayed as "OFF". The correction chart display section 1910*a* is normally displayed, and the output image chart display section 1910*b* is grayed out. Conversely, as illustrated in FIG. 19B, in a case where the correction chart selection button 1920 is displayed as "OFF", the output image chart selection button 1921 is displayed as "ON". The correction chart display section 1910*a* is grayed out, and the output image chart display section 1910*b* is normally displayed.

In a case where the correction chart selection button 1920 is displayed as "ON", the image forming apparatus 100 performs the above-mentioned processing for the print front-and-back position correction. In a case where the output image chart selection button 1921 is displayed as "ON", the image forming apparatus 100 uses, as the images for adjustment, images obtained by adding the marks 720 for correction of FIG. 3 to the output images, and registers the images as the images 1562 for adjustment of FIG. 15C. For that reason, the print front-and-back position correction can be performed through use of the images obtained by adding the marks 720 for correction to the output images.

Figure 20A:
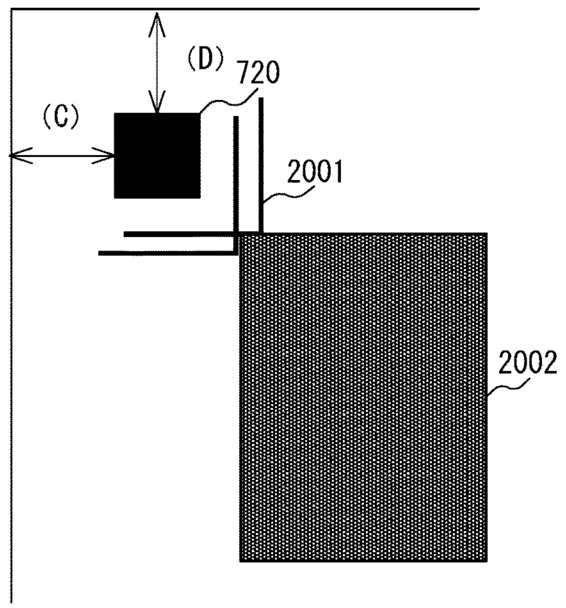
FIG. 20A and FIG. 20B are explanatory views for a method of generating images for adjustment.
Figure 20B:
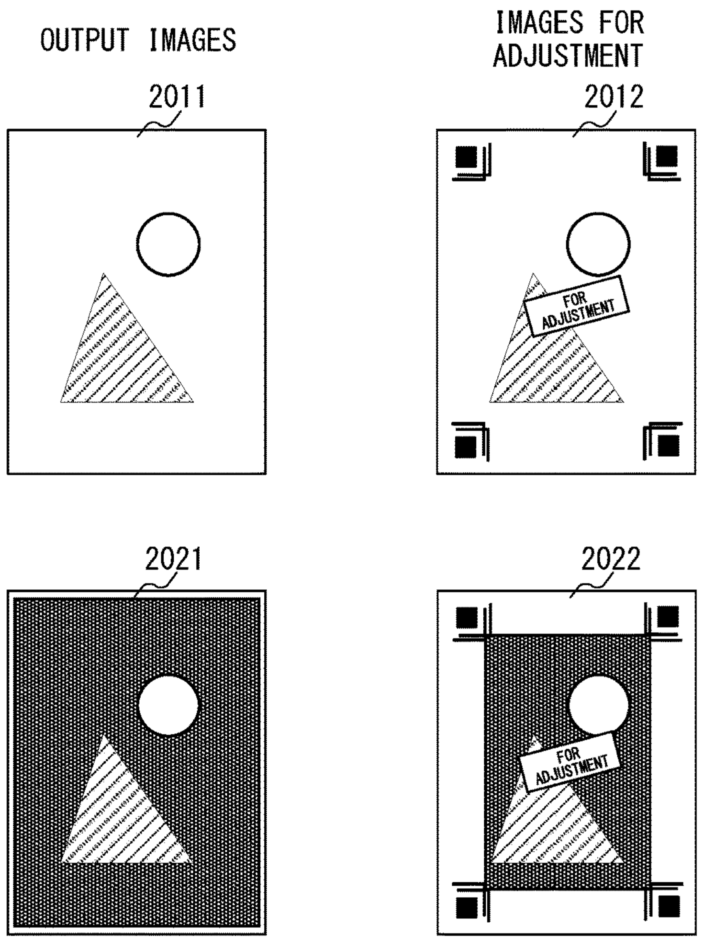
Figure 21:
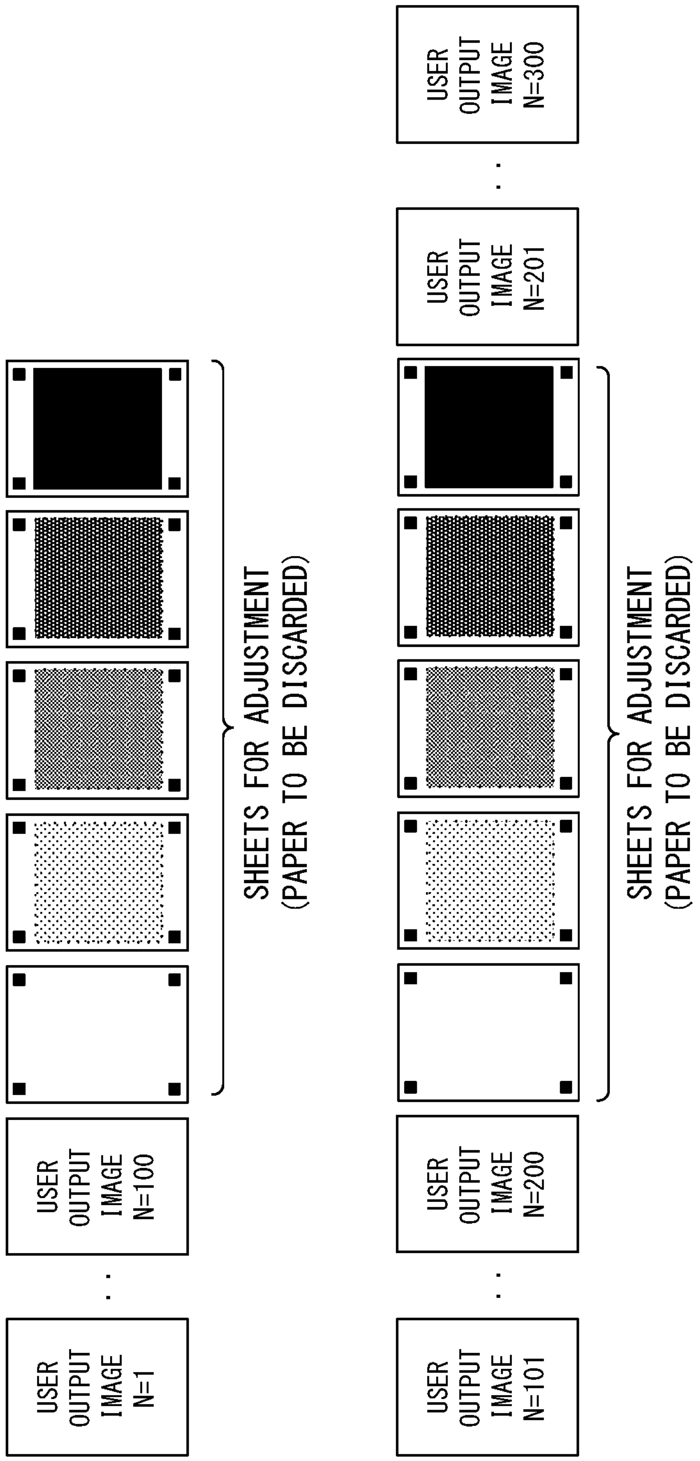
FIG. 21 is an explanatory view of timings to output sheets for adjustment during printing.

FIG. 20A and FIG. 20B are explanatory views for a method of generating images for adjustment by adding the marks 720 for correction to output images. FIG. 20A is an illustration of a margin area for adding one of the marks 720 for correction to an output image. FIG. 20B is an illustration of images for adjustment in which the marks 720 for correction are added to output images.

The marks 720 for correction of FIG. 20A are provided in the four corners (corner areas) of the paper sheet in the same manner as in FIG. 3, but in this case, only the mark 720 for correction on the upper left and the lengths (C) and (D) are illustrated for simplicity of description. In Modification Example as well, the length (A) to the length (V) are measured from the marks 720 for correction provided in the four corners (corner areas).

Margin lines 2001 for the marks for correction are boundary lines for generating margins for the reading apparatus 160 to read the marks 720 for correction. In a case where an output image overlaps with an area to which each mark 720 for correction is to be added, it becomes more difficult for the reading apparatus 160 to accurately read the marks 720 for correction. An output image area 2002 in which the output image is supposed to be formed is an area in which the original output image is masked with the margin lines 2001 for the marks for correction being used as boundaries. In this Modification Example, the margin lines 2001 for the marks for correction is included in the image for adjustment, but the margin lines 2001 for the marks for correction is not required to be included in the image for adjustment.

FIG. 20B is the illustration of the images for adjustment in each of which the original output image is masked through use of the margin lines 2001 for the marks for correction and the marks 720 for correction are added. The marks 720 for correction are added to an output image 2011, to thereby generate an image 2012 for adjustment. In the output image 2011, the original image is not to overlap with the areas of the marks 720 for correction. For that reason, the image 2012 for adjustment is an image in which the marks 720 for correction are added in four corners (corner areas) of the output image 2011.

The marks 720 for correction are added to an output image 2021, to thereby generate an image 2022 for adjustment. In the output image 2021, the original image is to overlap with the areas of the marks 720 for correction. For that reason, the image 2022 for adjustment is an image in which the marks 720 for correction are added in a margin area in which the original image is masked with the margin lines 2001 for the marks for correction being used as boundaries.

In order to simplify the description, no reference is made to the front surface image of a paper sheet in a case of determining the printing position deviation amounts on the back surface of the paper sheet, but it has been found that the printing position deviation amounts on the back surface differs depending on the toner adhesion amount of the front surface image in actuality. For that reason, for example, in a case in which the toner adhesion amount class is “5”, the printing position deviation amounts on the back surface may be set to have a total of 25 types in combination of five toner adhesion amount classes for the front surface and five toner adhesion amount classes for the back surface.

As described above, at a time of the print front-and-back position correction, the image forming apparatus 100 according to the at least one embodiment uses the images for adjustment corresponding to the pages selected by the operator to perform the print front-and-back position correction. Accordingly, it is possible to reduce the number of sheets for adjustment to be the paper to be discarded while updating the correction amount corresponding to the toner adhesion amount to a proper value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-028425, filed Feb. 27, 2023, which is hereby incorporated by reference herein in its entirety.

What is claimed is:

1. An image forming apparatus comprising:

an image former configured to form an image on a sheet through use of toner;

a reader configured to read the sheet on which a mark for correction is formed;

a display; and a processor configured to:

display a plurality of images included in a print job in a selectable manner on the display;

acquire user selection information indicating a selection result for an image selected from among the plurality of images;

determine, based on the user selection information, an image for adjustment to be formed by the image former, the image for adjustment including a pattern image, which is to have a toner adhesion amount corresponding to a density of the selected image, and the mark for correction;

control the image former to form the image for adjustment on a sheet;

control the reader to read the sheet on which the image for adjustment has been formed; and control a printing position of the selected image formed by the image former based on a reading result of the sheet on which the image for adjustment read by the reader has been formed.

2. The image forming apparatus according to claim 1, wherein the image former is configured to form a plurality of images for adjustment, the plurality of images for adjustment including a plurality of pattern images having different toner adhesion amounts and the marks for correction, and wherein the processor is configured to determine the image for adjustment including a pattern image corresponding to the density of the selected image based on the user selection information from among the plurality of images for adjustment.

3. The image forming apparatus according to claim 1, wherein the mark for correction comprises marks to be formed in corner areas of the sheet.

4. The image forming apparatus according to claim 1, wherein the processor is configured to generate a right-angle correction amount based on the reading result of the sheet on which the image for adjustment read by the reader has been formed, and wherein the processor is configured to control the printing position of the selected image formed by image former based on the right-angle correction amount.

5. The image forming apparatus according to claim 1, wherein the processor is configured to generate a trapezoidal correction amount based on the reading result of the sheet on which the image for adjustment read by the reader has been formed, and wherein the processor is configured to control the printing position of the selected image formed by the image former based on the trapezoidal correction amount.

6. The image forming apparatus according to claim 1, wherein the processor is configured to generate respective parameters of a lead position, a side position, a long-side-direction magnification, and a short-side-direction magnification based on the reading result of the sheet on which the image for adjustment read by the reader has been formed, and wherein the processor is configured to control the printing position of the selected image formed by the image former based on the respective parameters.

7. The image forming apparatus according to claim 1, wherein the processor is configured to control the image former to form the image for adjustment each time the images have been formed on a predetermined number of sheets.

8. The image forming apparatus according to claim 7, wherein the processor is configured to display a screen for setting the predetermined numbers of sheets on the display.

9. The image forming apparatus according to claim 1, wherein the image former includes a conveyance roller configured to convey the sheet to a delivery tray for delivering the sheet, and wherein the reader is configured to read the sheet while the conveyance roller is conveying the sheet.

10. The image forming apparatus according to claim 9, wherein the reader includes a first sensor configured to read a first surface of the sheet and a second sensor configured to read a second surface of the sheet opposite the first surface.

11. The image forming apparatus according to claim 10, wherein the selected image includes an image to be formed on the first surface and an image to be formed on the second surface, wherein the processor is configured to control a printing position of the image for the first surface based on a reading result of the first surface of the sheet on which the image for adjustment read by the first sensor has been formed, and wherein the processor is configured to control a printing position of the image for the second surface based on a reading result of the second surface of the sheet on which the image for adjustment read by the second sensor has been formed.

* * * * *